(12) United States Patent
Sanders et al.

(10) Patent No.: US 11,859,338 B2
(45) Date of Patent: Jan. 2, 2024

(54) RECYCLABLE, RENEWABLE, OR BIODEGRADABLE PACKAGE

(71) Applicant: The Procter & Gamble Company, Cincinnati, OH (US)

(72) Inventors: Michael David Sanders, Cincinnati, OH (US); Mark Robert Sivik, Mason, OH (US); Ian Oliver Malott, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 56 days.

(21) Appl. No.: 16/752,719

(22) Filed: Jan. 27, 2020

(65) Prior Publication Data

US 2020/0240068 A1   Jul. 30, 2020

Related U.S. Application Data

(60) Provisional application No. 62/797,669, filed on Jan. 28, 2019.

(51) Int. Cl.
*D06F 39/02* (2006.01)
*C11D 17/04* (2006.01)

(52) U.S. Cl.
CPC ............ *D06F 39/02* (2013.01); *C11D 17/045* (2013.01)

(58) Field of Classification Search
CPC .............................. D06F 39/02; C11D 17/045
USPC ....................................................... 68/17 A
See application file for complete search history.

(56) References Cited

U.S. PATENT DOCUMENTS

| 3,293,718 | A | 12/1966 | Sheets |
| 3,859,125 | A | 1/1975 | Miller et al. |
| 4,180,558 | A | 12/1979 | Goldberg et al. |
| 4,286,016 | A | 8/1981 | Dimond et al. |
| 4,287,219 | A | 9/1981 | Fabre |
| 4,315,965 | A | 2/1982 | Mason et al. |
| 4,342,813 | A | 8/1982 | Erickson |
| 4,349,531 | A | 9/1982 | Mlodozeniec et al. |
| 4,377,615 | A | 3/1983 | Suzuki et al. |
| 4,397,391 | A | 8/1983 | Cornelissens |
| 4,415,617 | A | 11/1983 | D'Elia |
| 4,639,390 | A | 1/1987 | Shoji |
| 4,892,758 | A | 1/1990 | Serbiak et al. |

(Continued)

FOREIGN PATENT DOCUMENTS

AU   2004/202461 B2   11/2007
CA         2695068 A1   9/2010

(Continued)

OTHER PUBLICATIONS

PCT Search Report for appl. No. PCT/US2018/015354, dated May 14, 2018, 13 pages.

(Continued)

*Primary Examiner* — Tinsae B Ayalew

(57) ABSTRACT

A package for a single unit dose detergent, the package having an outer shell and an inner structure. The outer shell and the inner structure comprise of a biodegradable material. The inner structure has one or more divided sections enabled to contain one or more single unit dose detergents articles. At least one of the one or more divided sections comprises a protuberance extending from a surface facing an inner surface of the outer shell.

8 Claims, 15 Drawing Sheets

(56) References Cited

U.S. PATENT DOCUMENTS

| | | | |
|---|---|---|---|
| 4,923,660 | A | 5/1990 | Willenberg et al. |
| 5,041,252 | A | 8/1991 | Fujii et al. |
| 5,110,678 | A | 5/1992 | Narukawa et al. |
| 5,120,888 | A | 6/1992 | Nohr et al. |
| 5,135,804 | A | 8/1992 | Harpell et al. |
| 5,158,810 | A | 10/1992 | Oishi et al. |
| 5,208,104 | A | 5/1993 | Ueda et al. |
| 5,230,853 | A | 7/1993 | Colegrove et al. |
| 5,246,603 | A | 9/1993 | Tsaur |
| 5,342,335 | A | 8/1994 | Rhim |
| 5,362,532 | A | 11/1994 | Famili et al. |
| 5,364,627 | A | 11/1994 | Song |
| 5,387,147 | A | 2/1995 | Ohshima et al. |
| 5,429,874 | A | 7/1995 | Vanputte |
| 5,455,114 | A | 10/1995 | Ohmory et al. |
| 5,470,424 | A | 11/1995 | Isaac et al. |
| 5,470,653 | A | 11/1995 | Honeycutt et al. |
| 5,486,418 | A | 1/1996 | Ohmory et al. |
| 5,518,730 | A | 5/1996 | Fuisz |
| 5,520,924 | A | 5/1996 | Chapman et al. |
| 5,538,735 | A | 7/1996 | Ahn |
| 5,585,059 | A | 12/1996 | Kobayashi et al. |
| 5,651,987 | A | 7/1997 | Fuisz |
| 5,691,015 | A | 11/1997 | Tsukamoto et al. |
| 5,705,183 | A | 1/1998 | Phillips et al. |
| 5,716,692 | A | 2/1998 | Warner et al. |
| 5,717,026 | A | 2/1998 | Ikimine et al. |
| 5,735,812 | A | 4/1998 | Hardy |
| 5,780,418 | A | 7/1998 | Niinaka et al. |
| 5,827,586 | A | 10/1998 | Yamashita et al. |
| 5,840,423 | A | 11/1998 | Sano et al. |
| 5,863,887 | A | 1/1999 | Gillette |
| 5,879,493 | A | 3/1999 | Johnson et al. |
| 5,911,224 | A | 6/1999 | Berger |
| 5,914,124 | A | 6/1999 | Mahoney et al. |
| 5,942,179 | A | 8/1999 | Tallentire et al. |
| 6,008,181 | A | 12/1999 | Cripe |
| 6,037,319 | A | 3/2000 | Dickler et al. |
| 6,066,396 | A | 5/2000 | Inada et al. |
| 6,080,346 | A | 6/2000 | Jack |
| 6,130,193 | A | 10/2000 | Gillette |
| 6,175,054 | B1 | 1/2001 | Jacques |
| 6,197,238 | B1 | 3/2001 | Wang et al. |
| 6,207,274 | B1 | 3/2001 | Ferenc et al. |
| 6,274,162 | B1 | 8/2001 | Steffenino et al. |
| 6,319,510 | B1 | 11/2001 | Yates |
| 6,406,797 | B1 | 6/2002 | Vanputte |
| 6,420,625 | B1 | 7/2002 | Jones et al. |
| 6,448,462 | B2 | 9/2002 | Groitzsch et al. |
| 6,465,407 | B2 | 10/2002 | Hayashi et al. |
| 6,552,123 | B1 | 4/2003 | Katayama et al. |
| 6,576,575 | B2 | 6/2003 | Griesbach, III et al. |
| 6,608,121 | B2 | 8/2003 | Isozaki et al. |
| 6,657,004 | B2 | 12/2003 | Mizutani |
| 6,699,826 | B1 | 3/2004 | Saijo et al. |
| 6,730,648 | B2 | 5/2004 | Gorlin et al. |
| 6,783,852 | B2 | 8/2004 | Inada et al. |
| 6,787,512 | B1 | 9/2004 | Verrall et al. |
| 6,808,598 | B1 | 10/2004 | Takeuchi et al. |
| 6,818,606 | B1 | 11/2004 | Hanada et al. |
| 6,898,921 | B2 | 5/2005 | Duffield |
| 6,949,498 | B2 | 9/2005 | Murphy et al. |
| 6,956,070 | B2 | 10/2005 | Fujiwara et al. |
| 6,977,116 | B2 | 12/2005 | Cabell et al. |
| 7,026,049 | B2 | 4/2006 | Endo et al. |
| 7,041,628 | B2 | 5/2006 | Sunder |
| 7,067,575 | B2 | 6/2006 | Kitamura et al. |
| 7,083,047 | B2 | 8/2006 | Bone et al. |
| 7,094,744 | B1 | 8/2006 | Kobayashi et al. |
| 7,115,551 | B2 | 10/2006 | Hasenorhrl et al. |
| 7,169,740 | B2 | 1/2007 | Sommerville-Roberts et al. |
| 7,196,026 | B2 | 3/2007 | Di Luccio et al. |
| RE39,557 | E | 4/2007 | Moe |
| 7,226,899 | B2 | 6/2007 | Cole et al. |
| 7,285,520 | B2 | 10/2007 | Krzysik et al. |
| 7,387,787 | B2 | 6/2008 | Fox |
| 7,407,669 | B2 | 8/2008 | Leung et al. |
| 7,429,273 | B2 | 9/2008 | DeDominicis et al. |
| 7,446,084 | B2 | 11/2008 | Barthel et al. |
| 7,491,407 | B2 | 2/2009 | Pourdeyhimi et al. |
| 7,507,698 | B2 | 3/2009 | Franzolin et al. |
| 7,547,737 | B2 | 6/2009 | Kochvar et al. |
| 7,563,757 | B2 | 7/2009 | Kouvroukoglou et al. |
| 7,708,840 | B2 | 5/2010 | Wiedemann et al. |
| 7,727,946 | B2 | 6/2010 | Catalfamo et al. |
| 7,824,588 | B2 | 11/2010 | Yang et al. |
| 7,856,989 | B2 | 12/2010 | Karles et al. |
| 7,967,801 | B2 | 6/2011 | Hammons et al. |
| 8,338,358 | B2 | 12/2012 | Bernhardt |
| 8,349,232 | B2 | 1/2013 | Pourdeyhimi et al. |
| 8,785,361 | B2 | 7/2014 | Sivik |
| 9,074,305 | B2 | 7/2015 | Glenn, Jr. |
| 9,163,205 | B2 | 10/2015 | Sivik |
| 9,175,250 | B2 | 11/2015 | Sivik |
| 9,267,095 | B2 | 2/2016 | Delaney |
| 9,421,153 | B2 | 8/2016 | Sivik |
| 9,480,628 | B2 | 11/2016 | Sivik |
| 9,493,726 | B2 | 11/2016 | Vinson |
| 9,796,948 | B2 | 10/2017 | Shearouse |
| 10,045,915 | B2 | 8/2018 | Glenn, Jr. |
| 10,059,495 | B1 | 8/2018 | Korustan et al. |
| 2001/0037851 | A1 | 11/2001 | Mortellite et al. |
| 2002/0013251 | A1 | 1/2002 | Hayashi |
| 2002/0018906 | A1 | 2/2002 | Clark |
| 2002/0098994 | A1 | 7/2002 | Zafar |
| 2002/0161088 | A1 | 10/2002 | Kochvar et al. |
| 2002/0173213 | A1 | 11/2002 | Chu et al. |
| 2003/0017208 | A1 | 1/2003 | Ignatious et al. |
| 2003/0045446 | A1 | 3/2003 | Dihora et al. |
| 2003/0050208 | A1 | 3/2003 | Duquet et al. |
| 2003/0166495 | A1 | 9/2003 | Wang et al. |
| 2003/0185872 | A1 | 10/2003 | Kochinke |
| 2003/0216098 | A1 | 11/2003 | Carlyle |
| 2003/0224959 | A1 | 12/2003 | Smith |
| 2004/0129032 | A1 | 7/2004 | Severns |
| 2004/0167256 | A1 | 8/2004 | Verrall et al. |
| 2004/0170836 | A1 | 9/2004 | Bond et al. |
| 2004/0180597 | A1 | 9/2004 | Kamada et al. |
| 2004/0204543 | A1 | 10/2004 | Yang |
| 2005/0003048 | A1 | 1/2005 | Pearce et al. |
| 2005/0003980 | A1 | 1/2005 | Baker |
| 2005/0003991 | A1 | 1/2005 | MacQuarrie |
| 2005/0008776 | A1 | 1/2005 | Chhabra et al. |
| 2005/0010010 | A1 | 1/2005 | Kitamura et al. |
| 2005/0136112 | A1 | 6/2005 | Gonzales et al. |
| 2005/0136780 | A1 | 6/2005 | Clark et al. |
| 2005/0186256 | A1 | 8/2005 | Dihel et al. |
| 2005/0209574 | A1 | 9/2005 | Boehringer et al. |
| 2005/0281757 | A1 | 12/2005 | Ibrahim et al. |
| 2006/0013869 | A1 | 1/2006 | Ignatious et al. |
| 2006/0035042 | A1 | 2/2006 | Morken |
| 2006/0083784 | A1 | 4/2006 | Ignatious et al. |
| 2006/0111261 | A1 | 5/2006 | Sadlowski |
| 2006/0127458 | A1 | 6/2006 | Kiser et al. |
| 2006/0134412 | A1 | 6/2006 | Mackey et al. |
| 2006/0160453 | A1 | 7/2006 | Suh |
| 2006/0189772 | A1 | 8/2006 | Scheibel et al. |
| 2006/0205628 | A1 | 9/2006 | Deinhammer |
| 2006/0254013 | A1 | 11/2006 | Konishi et al. |
| 2006/0254014 | A1 | 11/2006 | Konishi et al. |
| 2006/0258251 | A1 | 11/2006 | Konishi et al. |
| 2006/0264130 | A1 | 11/2006 | Karles et al. |
| 2007/0054579 | A1 | 3/2007 | Baker et al. |
| 2007/0110792 | A9 | 5/2007 | Simon |
| 2007/0128256 | A1 | 6/2007 | Aubrun-Sonneville |
| 2007/0134304 | A1 | 6/2007 | Aubrun-Sonneville et al. |
| 2007/0134481 | A1 | 6/2007 | Aubrun-Sonneville |
| 2007/0253926 | A1 | 11/2007 | Tadrowski et al. |
| 2007/0259170 | A1 | 11/2007 | Brown et al. |
| 2007/0259996 | A1 | 11/2007 | Vicari et al. |
| 2007/0298064 | A1 | 12/2007 | Koslow |
| 2008/0035174 | A1 | 2/2008 | Aubrun-Sonneville et al. |
| 2008/0108748 | A1 | 5/2008 | Buckley et al. |
| 2008/0118727 | A1 | 5/2008 | Andersen |

(56) References Cited

U.S. PATENT DOCUMENTS

| | | | |
|---|---|---|---|
| 2008/0146481 A1 | 6/2008 | Brown et al. |
| 2008/0149119 A1 | 6/2008 | Marquez et al. |
| 2008/0220054 A1 | 9/2008 | Shastri et al. |
| 2008/0226919 A1 | 9/2008 | Hosoda et al. |
| 2008/0242572 A1 | 10/2008 | Icht et al. |
| 2008/0269095 A1 | 10/2008 | Aubrun-Sonneville |
| 2009/0004254 A1 | 1/2009 | Maibach |
| 2009/0041820 A1 | 2/2009 | Wu et al. |
| 2009/0061496 A1 | 3/2009 | Kuhn et al. |
| 2009/0061719 A1 | 3/2009 | Shibutani et al. |
| 2009/0155326 A1 | 6/2009 | Mack et al. |
| 2009/0181587 A1 | 7/2009 | Kang et al. |
| 2009/0249558 A1 | 10/2009 | Fileccia et al. |
| 2009/0250370 A1* | 10/2009 | Whitchurch ............ B29C 48/07 206/524.2 |
| 2009/0285718 A1 | 11/2009 | Privitera et al. |
| 2009/0291282 A1 | 11/2009 | Kitamura et al. |
| 2010/0018641 A1 | 1/2010 | Branham et al. |
| 2010/0021517 A1 | 1/2010 | Ahlers et al. |
| 2010/0105821 A1 | 4/2010 | Verrall et al. |
| 2010/0166854 A1 | 7/2010 | Michniak-Kohn et al. |
| 2010/0196440 A1 | 8/2010 | Stark et al. |
| 2010/0266668 A1 | 10/2010 | Coffee et al. |
| 2010/0279905 A1 | 11/2010 | Glenn, Jr. et al. |
| 2010/0285101 A1 | 11/2010 | Moore et al. |
| 2011/0024450 A1* | 2/2011 | Maas ................ B65D 83/0055 222/95 |
| 2011/0136719 A1 | 6/2011 | Jalbert et al. |
| 2011/0159267 A1 | 6/2011 | Lee et al. |
| 2011/0223381 A1 | 9/2011 | Mackey et al. |
| 2011/0230112 A1 | 9/2011 | Rosé et al. |
| 2011/0301070 A1 | 12/2011 | Ochomogo et al. |
| 2012/0021026 A1 | 1/2012 | Chhabra et al. |
| 2012/0027838 A1 | 2/2012 | Gordon et al. |
| 2012/0048769 A1 | 3/2012 | Sivik et al. |
| 2012/0052036 A1 | 3/2012 | Glen, Jr. et al. |
| 2012/0053103 A1 | 3/2012 | Sivik et al. |
| 2012/0053108 A1 | 3/2012 | Glen, Jr. et al. |
| 2012/0058166 A1 | 3/2012 | Glen, Jr. et al. |
| 2012/0082037 A1 | 3/2012 | Sivik et al. |
| 2012/0154300 A1 | 6/2012 | Ma |
| 2012/0172831 A1 | 7/2012 | Darcy et al. |
| 2012/0215148 A1 | 8/2012 | Ewert et al. |
| 2012/0237576 A1 | 9/2012 | Gordon et al. |
| 2013/0171421 A1 | 7/2013 | Weisman et al. |
| 2013/0172226 A1 | 7/2013 | Dreher et al. |
| 2014/0287973 A1 | 9/2014 | Sivik et al. |
| 2014/0366294 A1 | 12/2014 | Roe |
| 2015/0048001 A1 | 2/2015 | Bailey |
| 2015/0104856 A1 | 4/2015 | Astrid |
| 2015/0313807 A1 | 11/2015 | Lynch |
| 2016/0010041 A1 | 1/2016 | Sivik |
| 2016/0040105 A1 | 2/2016 | Depoot et al. |
| 2016/0101204 A1 | 4/2016 | Lynch |
| 2016/0186095 A1 | 6/2016 | Vockenroth |
| 2016/0200501 A1 | 7/2016 | Lee |
| 2016/0271021 A1 | 9/2016 | Glenn, Jr. |
| 2016/0340624 A1 | 11/2016 | Sivik |
| 2016/0374906 A1 | 12/2016 | Sivik |
| 2017/0009191 A1 | 1/2017 | Maes |
| 2017/0067002 A1 | 3/2017 | Cumming |
| 2017/0164612 A1 | 6/2017 | Ripberger |
| 2017/0320105 A1 | 11/2017 | Roozrokh |
| 2018/0223229 A1 | 8/2018 | Tan |
| 2018/0338890 A1 | 11/2018 | Glenn, Jr. |

FOREIGN PATENT DOCUMENTS

| | | | |
|---|---|---|---|
| DE | 10 2007 01160 A1 | 9/2008 |
| EP | 1 275 368 A1 | 1/2003 |
| EP | 1 306 425 A2 | 5/2003 |
| EP | 1 409 628 B1 | 2/2006 |
| EP | 1 512 701 B1 | 6/2006 |
| EP | 1 887 036 A2 | 2/2008 |
| EP | 1 888 036 | 2/2008 |
| EP | 2108597 A1 | 10/2009 |
| EP | 1 436 376 B1 | 4/2010 |
| EP | 2 226 379 A1 | 9/2010 |
| EP | 1 948 771 B1 | 12/2010 |
| EP | 2 319 965 A1 | 5/2011 |
| EP | 2 363 432 A1 | 9/2011 |
| EP | 2 363 517 A1 | 9/2011 |
| EP | 2 395 142 A1 | 12/2011 |
| GB | 2107579 A | 5/1993 |
| GB | 2375542 | 11/2002 |
| GB | 2449418 | 11/2008 |
| HU | 221299 B1 | 9/2002 |
| JP | 62-156348 | 7/1987 |
| JP | 3040879 A | 2/1991 |
| JP | 3101618 A | 4/1991 |
| JP | 09279457 | 10/1997 |
| JP | 10008364 | 1/1998 |
| JP | 10158700 A | 6/1998 |
| JP | 2000169896 A | 6/2000 |
| JP | 2009079329 | 4/2009 |
| WO | WO 1992/006603 A1 | 4/1992 |
| WO | WO 1994/002377 A1 | 2/1994 |
| WO | WO 94/04656 A2 | 3/1994 |
| WO | WO 95/23888 A1 | 9/1995 |
| WO | WO 99/57155 | 11/1999 |
| WO | WO 2000/013680 A2 | 3/2000 |
| WO | WO0027958 A1 | 5/2000 |
| WO | WO 01/25322 A1 | 4/2001 |
| WO | WO 2001/54667 A1 | 8/2001 |
| WO | WO 03/060007 A1 | 7/2003 |
| WO | WO 2004/009335 A1 | 1/2004 |
| WO | WO 2004/081162 A1 | 9/2004 |
| WO | WO 2005/068604 A1 | 7/2005 |
| WO | WO 2006/106514 A2 | 10/2006 |
| WO | WO 2007/089259 A1 | 8/2007 |
| WO | WO 2007/093558 A3 | 1/2008 |
| WO | WO 2009/022761 A1 | 2/2009 |
| WO | WO 2007/014221 A3 | 4/2009 |
| WO | WO2009047124 | 4/2009 |
| WO | WO 2009/103576 A1 | 8/2009 |
| WO | WO 2009/121900 A1 | 10/2009 |
| WO | WO 2010/015709 A2 | 2/2010 |
| WO | WO 2011/153023 A1 | 12/2011 |
| WO | WO2012003367 A3 | 3/2012 |
| WO | 2016054459 A1 | 4/2016 |
| WO | WO2017096354 A1 | 6/2017 |

OTHER PUBLICATIONS

PCT Search Report for appl. No. PCT/CN2017/087707, dated Feb. 24, 2018, 12 pages.

PCT Search Report for appl. No. PCT/US2017/046391, dated Nov. 8, 2017, 17 pages.

PCT Search Report for appl. No. PCT/US2018/015357, dated Apr. 11, 2018, 14 pages.

PCT Search Report for appl. No. PCT/US2018/015358, dated Apr. 16, 2018, 15 pages.

PCT Search Report for app. No. PCT/US2019/014452, dated Apr. 8, 2019, 14 pages.

PCT Search Report for appl. No. PCT/US2019/014453, dated Apr. 8, 2019, 15 pages.

PCT Search Report for appl. No. PCT/US2019/014454, dated Apr. 5, 2019, 15 pages.

PCT Search Report for appl. No. PCT/US2019/014455, dated Apr. 5, 2019, 15 pages.

PCT Search Report for appl. No. PCT/US2019/014443, dated Apr. 17, 2019, 15 pages.

PCT Search Report for appl. No. PCT/US2019/014444, dated Apr. 16, 2019, 15 pages.

PCT Search report for appl. No. PCT/US2019/014451, dated Apr. 24, 2019, 12 pages.

PCT Search Report for appl. No. PCT/US2019/019547, dated May 22, 2019, 12 pages.

PCT Search Report for appl. No. PCT/US2019/049727, dated Jan. 2, 2020, 12 pages.

(56) References Cited

OTHER PUBLICATIONS

PCT Search report for appl. No. PCT/US2019/040240, dated Dec. 9, 2019, 15 pages.
PCT Search Report for appl. No. PCT/US19/40242, dated Oct. 22, 2019, 14 pages.
PCT Search Report for appl. No. PCT/US2019/052321, 12 pages, dated Dec. 12, 2019.
PCT Search Report for App. No. PCT/US2020/015189, dated May 7, 2020. 15 pgs.
EP Search Report for appl. No. 19163586.1-1105, dated Sep. 30, 2019, 8 pages.
Search Report for appl. No. 19163588.7-1105, dated Sep. 30, 2019, 7 pages.
PCT Search Report for appl. No. PCT/CN2017/072926, dated Feb. 6, 2017, 5 pages.
PCT Search Report for appl. No. PCT/CN2017/072927, dated Feb. 6, 2017, 6 pages.
PCT Search Report for appl. No. PCT/CN2017/072935, dated Jun. 9, 2017, 4 pages.
PCT appl. No. PCT/CN2018/074281, dated Aug. 29, 2019, 7 pages.
PCT Search Report for appl. No. PCT/ CN2018/074282, dated Oct. 22, 2018, 5 pages.
Makadia, et al., "Poly Lactic-co-Glycolic Acid (PLGA) as Biodegradable Controlled Drug Delivery Carrier", Polymers, 3, pp. 1377-1397 (2011).
Smith, et al., "Nanofibrous Scaffolds and Their Biological Effects", Nantechnologies for the Life Sciences, vol. 9, pp. 188-215 (2006).
Wang, et al., "A Novel Controlled Release Drug Delivery System for Multiple Drugs Based on Electrospun Nanofibers Containing Nanoparticles", Journal of Pharmaceutical Sciences, vol. 99, No. 12 (Dec. 2010).

\* cited by examiner

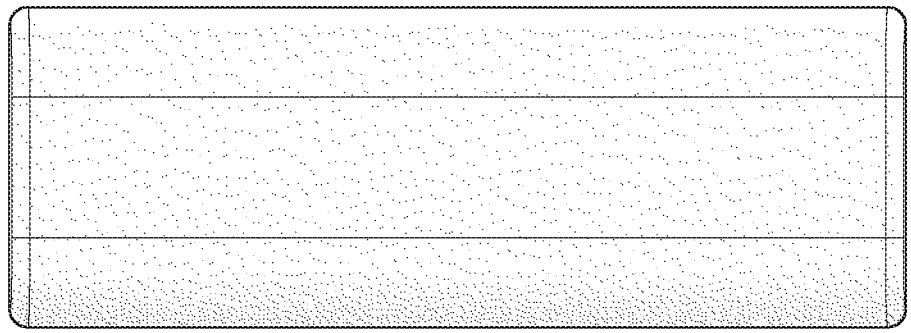
FIG. 18
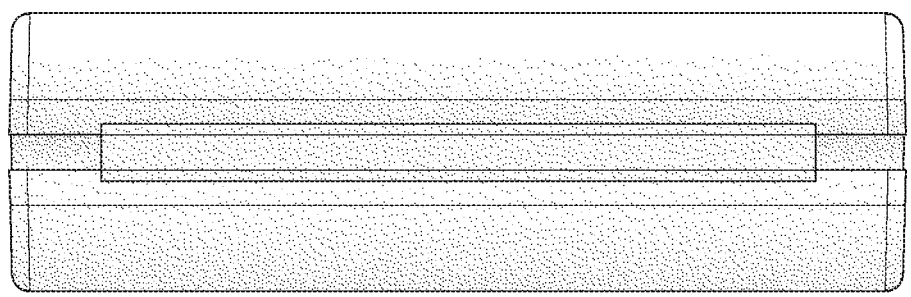
FIG. 19
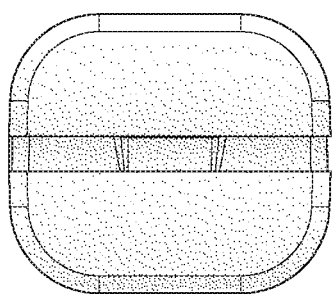 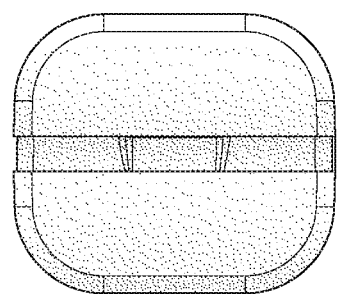
FIG. 20　　　　　　　　FIG. 21

RECYCLABLE, RENEWABLE, OR BIODEGRADABLE PACKAGE

FIELD OF THE INVENTION

The present invention relates to packages for single unit dose articles that are biodegradable and designed to protect the single unit dose articles.

BACKGROUND OF THE INVENTION

Packages that do not harm the environment are desirable. One way of making products that do not harm the environment is by making them biodegradable. However, many products used by consumers can be damaged by the same things that allow for a package to be biodegradable. For example, a biodegradable package will normally not be made of plastic. Although plastic may be recycled, it will not biodegrade at the rate of other materials. Other materials such as paper are biodegradable. However, they are more susceptible when exposed to fluids such as water.

Additionally, the products placed in the biodegradable packages are placed at risk of being exposed to such elements as water by being in a biodegradable package. This is particularly true for products that are able to dissolve in water. As such, there remains a need to create a biodegradable package that can contain products that are dissolvable in water and is enabled to protect those products from exposure to external conditions.

SUMMARY OF THE INVENTION

A package for a single unit dose detergent, the package comprising an outer shell and an inner structure, wherein the outer shell and the inner structure comprise of a biodegradable material, wherein the inner structure comprises one or more divided sections enabled to contain one or more single unit dose detergents articles, and wherein at least one of the one or more divided sections comprises a protuberance extending from a surface facing an inner surface of the outer shell.

BRIEF DESCRIPTION OF THE DRAWINGS

FIG. 18 is a bottom view of the CONTAINER of FIG. 15.
FIG. 19 is a back view of the CONTAINER of FIG. 15.
FIG. 20 is a right view of the CONTAINER of FIG. 15.
FIG. 21 is a left view of the CONTAINER of FIG. 15.

DETAILED DESCRIPTION OF THE INVENTION

Figure 1:
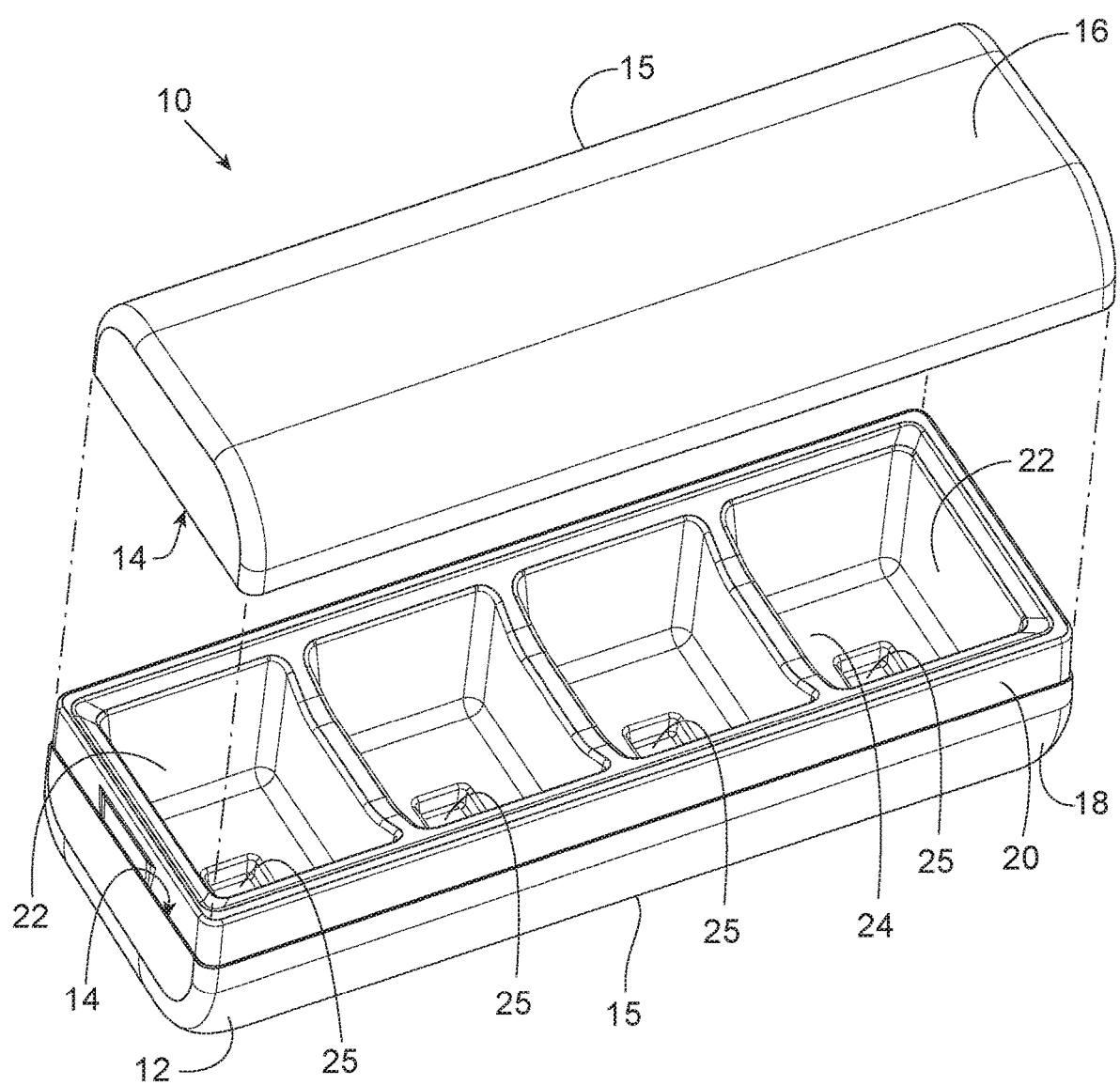
FIG. 1 is a package having a top section and a bottom section.

As used herein, the phrases "water-soluble unit dose article," "water-soluble fibrous structure", and "water-soluble fibrous element" mean that the unit dose article, fibrous structure, and fibrous element are miscible in water. In other words, the unit dose article, fibrous structure, or fibrous element is capable of forming a homogeneous solution with water at ambient conditions. "Ambient conditions" as used herein means 23° C.±1.0° C. and a relative humidity of 50%±2%. The water-soluble unit dose article may contain insoluble materials, which are dispersible in aqueous wash conditions to a suspension mean particle size that is less than about 20 microns, or less than about 50 microns.

The fibrous water-soluble unit dose article may include any of the disclosures found in U.S. patent application Ser. No. 15/880,594 filed on Jan. 26, 2018; U.S. patent application Ser. No. 15/880,599 filed Jan. 26, 2018; and U.S. patent application Ser. No. 15/880,604 filed Jan. 26, 2018; incorporated by reference in their entirety.

Herein is provided biodegradable package for a single unit dose detergent product. The package comprises an internal or inner structure that is biodegradable. It is to be understood that this invention is not limited to the specific components, articles, processes and/or conditions described, as these may, of course, vary. It is also to be understood that the terminology used herein is for the purpose of describing particular embodiments only and is not intended to be limiting.

The package has an outer shell. The outer shell may have a top section and bottom section that are able to join and make a closed volumetric shape. The top section may comprise a lid. The outer shell may be made from a single piece of material folded into a volumetric shape. The volumetric shape may be any known volumetric shape. The package is a three-dimensional space enclosed by a closed surface formed by the outer shell. The single-piece outer shell may have a hinged lid. The outer shell may have a sealing portion to seal the lid on the outer shell. For example, the lid may have a sealing portion attached to a side wall of the outer shell. The sealing portion may be attached to the outer shell by known attachment means. For example, the sealing portion may be attached to the outer shell by an adhesive or using staples or tacks. The sealing portion may include a quick release tab. The quick release tab may be a pull tab that detaches the lid from the side wall to allow the outer shell to be opened. In some embodiments, the outer shell includes a child-resistant opening. The type of child-resistant opening is not particularly limited. For example, the child-resistant opening may require a significant initial force to begin opening the outer shell such that a child would find it difficult to open the outer shell. Typically, the outer shell may be able to withstand a drop from a height ranging from 1.0 to 1.5 meters without damage to the majority of unit dose detergents in the outer shell. In some embodiments, the breakage rate after a drop from a height ranging from 1.0 to 1.5 meters is limited to 30% or less, 25% or less, 20% or less, 15% or less, 10% or less, 5% or less or none of the single unit dose detergents in the outer shell. Such a breakage rate may be measured by dropping a package from a height of 1.0 to 1.5 meters, noting the number of broken single unit doses in the outer shell, repeating the test twice more with fresh outer shells (with unbroken capsules) and averaging the rate of breakage from the three tests.

The inner structure comprises of one or more divided sections enabled to hold product. The one or more divided sections comprise one or more protuberance(s) that extend from a surface of the divided section to contact a surface of the outer shell. The inner structure may be comprised of the same biodegradable material as the outer shell or of a different biodegradable material. The inner structure may be integral to the outer shell and formed as part of or connected to the outer shell or the inner structure can be distinct from the outer shell.

The outer shell and/or the inner structure may comprise of plant material, such as, for example, woody material, herbaceous material or product recovery material (fibrous material) and the like. Examples of wood material include and are not limited to, lumber waste, wood processing waste, thinned wood, forest remainder material, include pruned branches (trees, fruit trees), the application site, core, bark, leaves, roots, fruits or there is such a freshman branch of the growth in developing. The herbaceous raw materials include without limitation, for example, bamboo, bagasse, rice hulls, rice straw, wheat straw, grass, bamboo grass, pampas grass, reeds, stems, such as kudzu, leaves, roots, seeds and surrounding tissue, and growth in developing of bamboo shoots. Bamboo and pulp derived from Bamboo is preferred. It is understood that these are examples of plant raw materials and that they are not intended to be limiting. Materials may include any provided that raw materials include plant fibers such as cellulose fibers.

It is understood by one of skill in the art that the package outer shell, the package inner structure, or both may be made by any known process used to make molded package structures. Additionally, the package may have a protective coating applied to the outer shell, provided that the protective coating is biodegradable.

FIG. 1 shows a package 10 having an outer shell 15 and an inner structure 20. The outer shell has a lid 16 and a bottom section 18 capable of holding the tray. The lid 16 may be attached to the bottom section 18 by any means known or may be integral to the bottom forming an integral part of the outer shell 15. The outer shell has an outer surface 12 and an inner surface 14. The inner structure 20 comprises of one or more divided sections 22 or storage sections 22 enabled to hold product. The one or more divided sections 22 comprise one or more protuberance(s) 25 that extend from a surface 24 of the divided section to contact a surface of the outer shell 15.

Figure 1A:
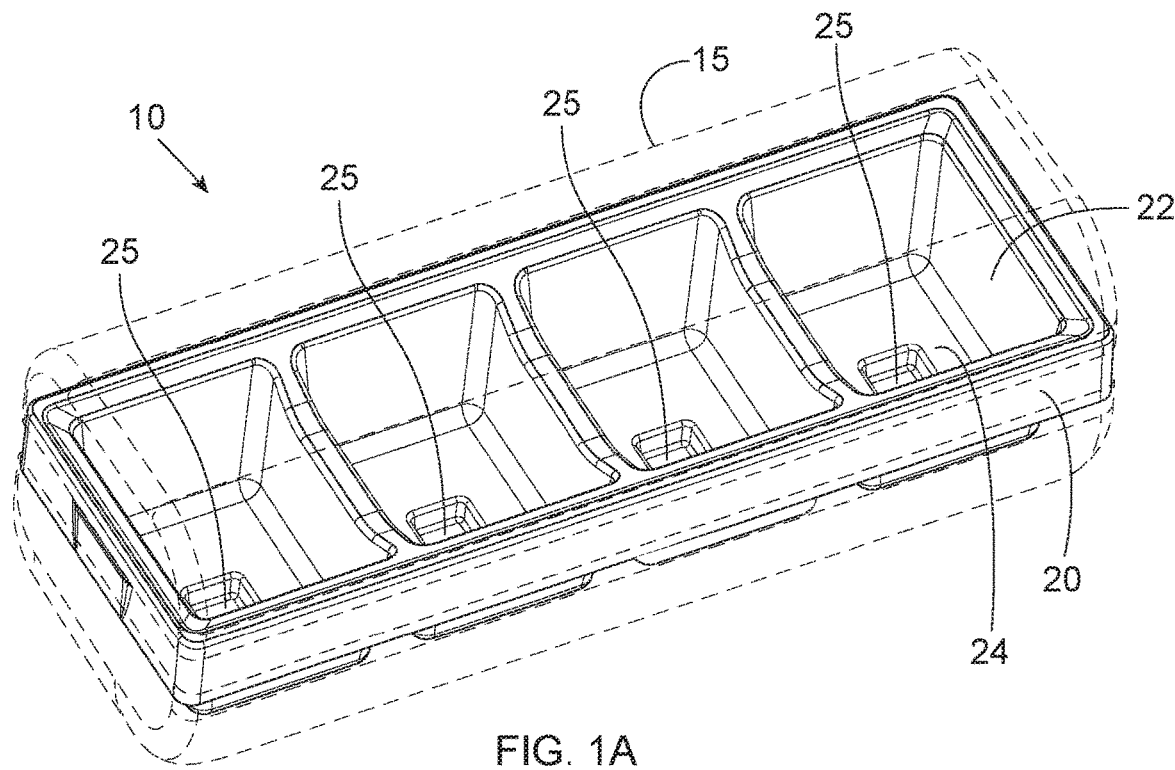
FIG. 1*a* is the package of FIG. 1 with the outer shell removed.

FIG. 1A shows the package 10 with the outer shell 15 removed. As shown in the FIG. 1A, the inner structure 20 has one or more divided sections 22 (three as shown in the figure) that have one or more protuberances 25 that extend from a surface 24. As shown in FIG. 1A, the protuberances may be hollow or not hollow (not shown).

Figure 2:
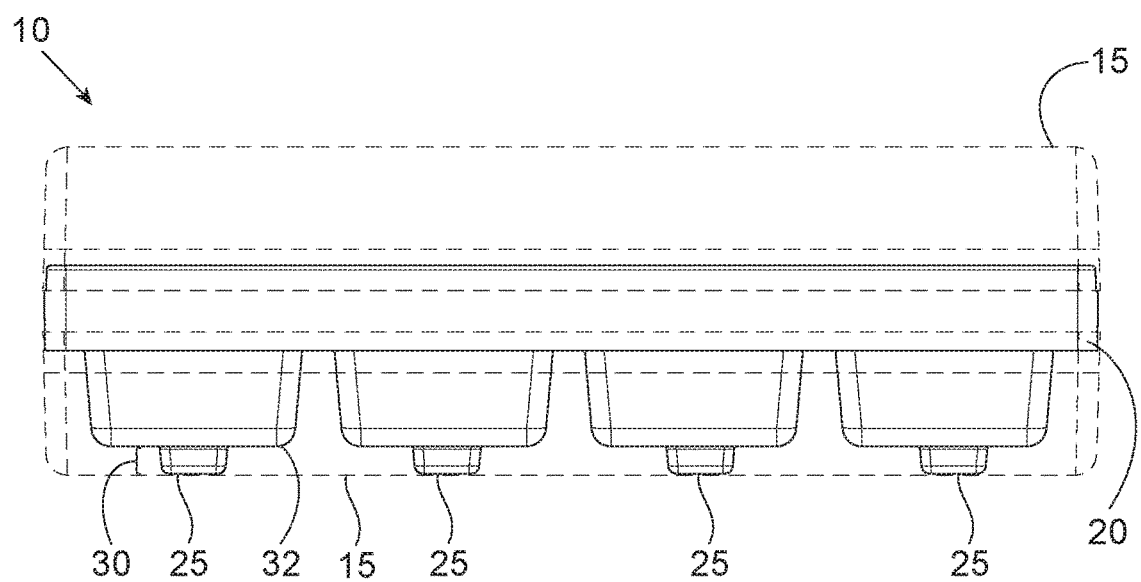
FIG. 2 is a different view of the package of FIG. 1*a*.
Figure 3:
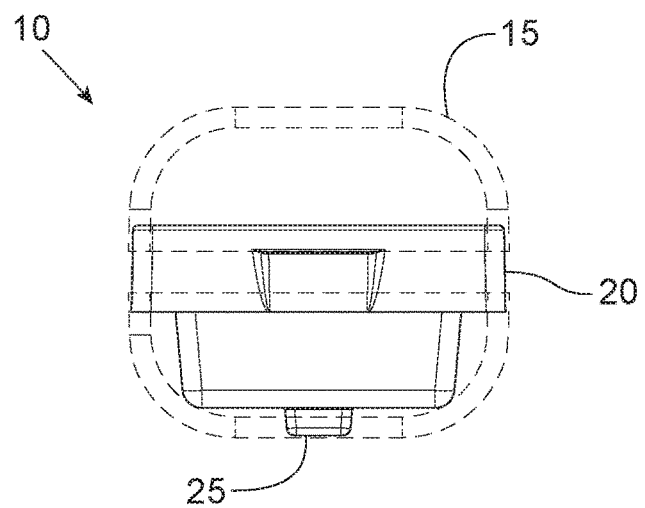
FIG. 3 is a different view of the package of FIG. 1*a*.

FIG. 2 and FIG. 3 show alternative views of the package 10 with the outer shell 15 dotted out. As shown in FIG. 2 and FIG. 3, the inner structure 20 has divided sections enabled to hold product. The divided sections each have a protuberance 25 extending from a surface of the divided section that contacts the lower surface of the outer shell. The use of a protuberance 25 creates a gap 30 between the planar surface 32 of the storage section 22 and the outer shell 15.

Figure 4:
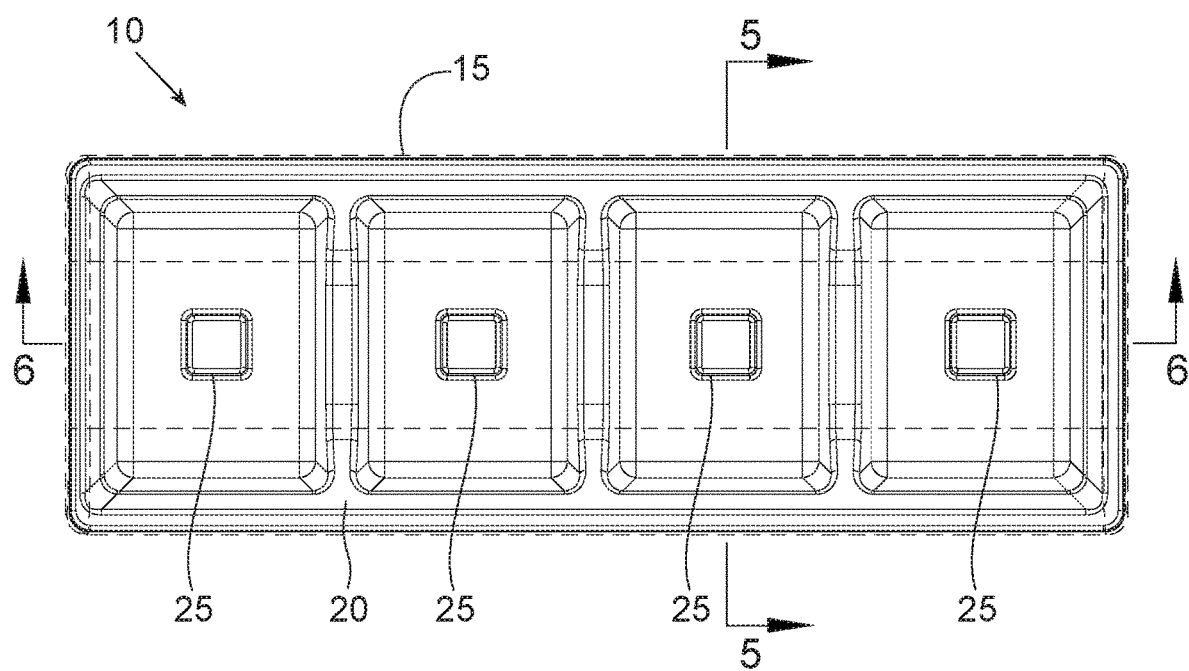
FIG. 4 is a different view of the package of FIG. 1*a*.
Figure 5:
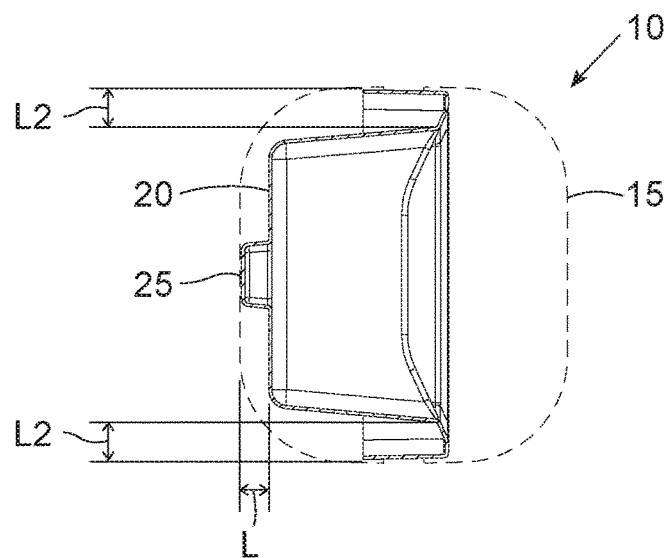
FIG. 5 is a cross section view taken on the line 5-5 of the package of FIG. 4.
Figure 6:
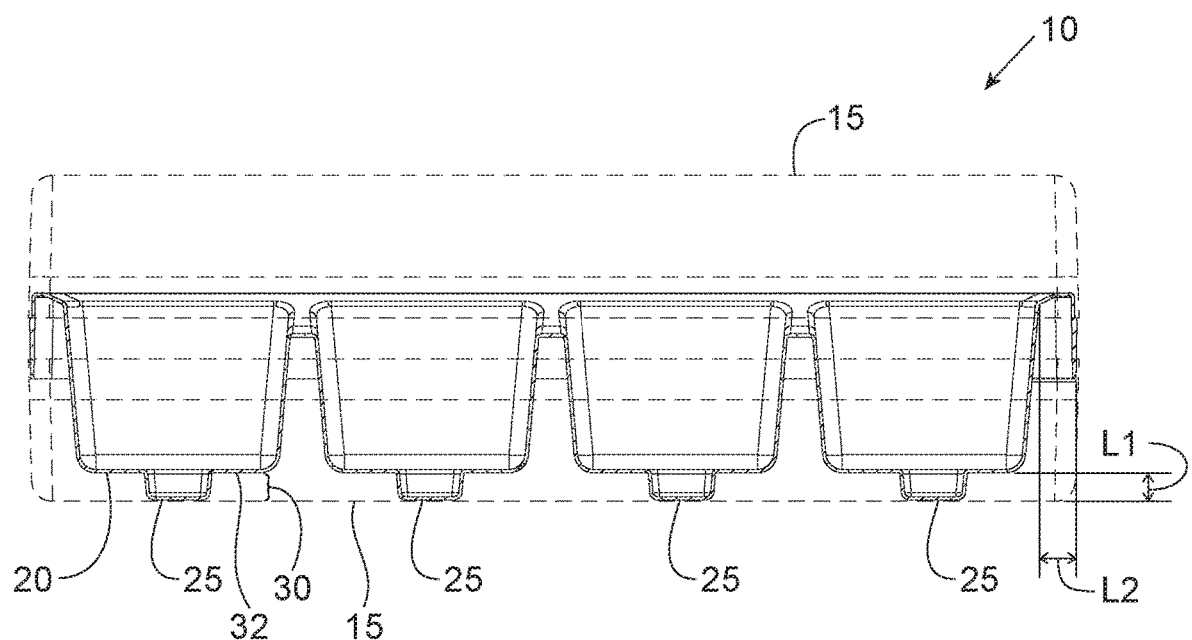
FIG. 6 is a cross section view taken on the line 6-6 of the package of FIG. 4.
Figure 7:
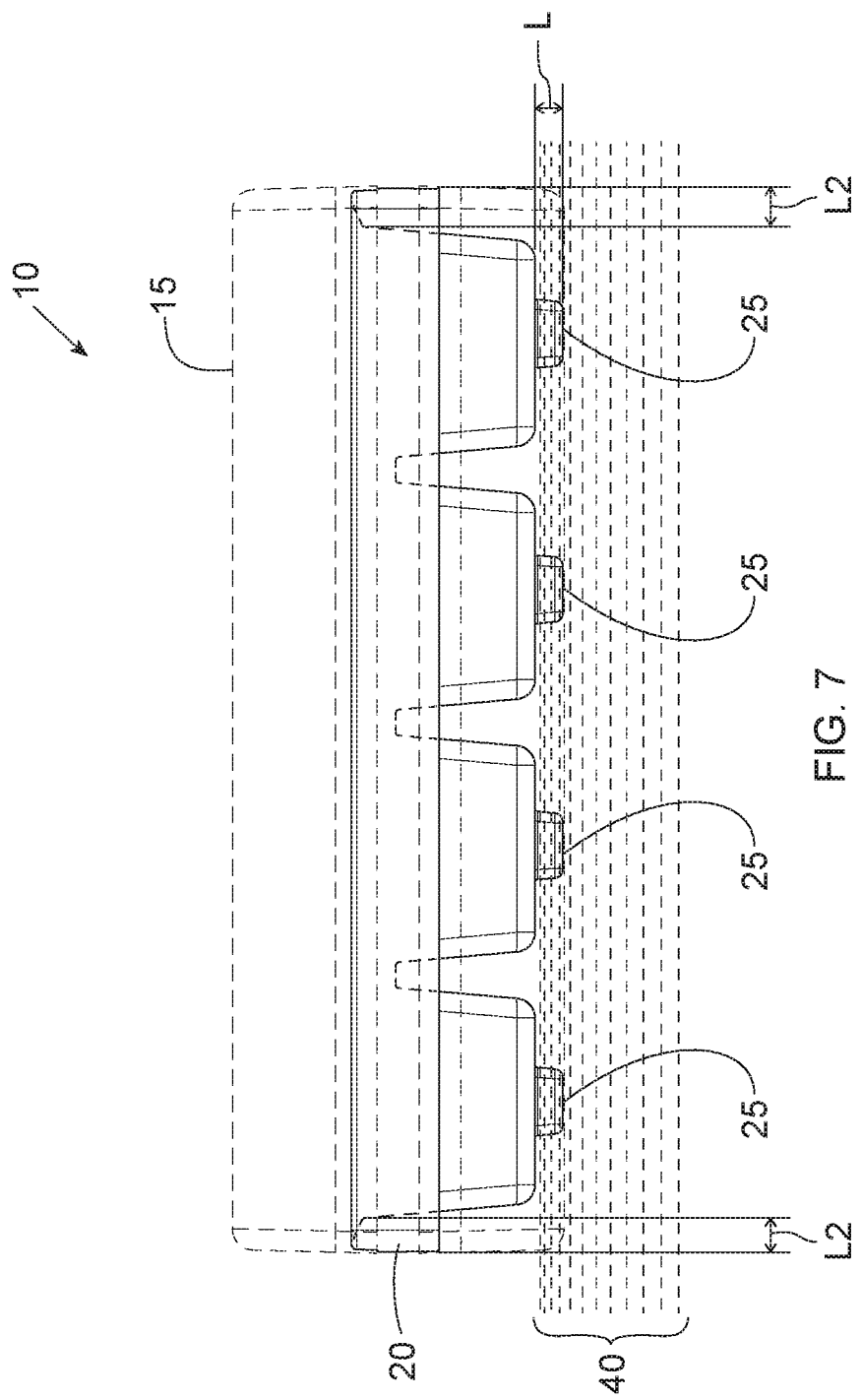
FIG. 7 is a package with the outer shell removed.
Figure 8:
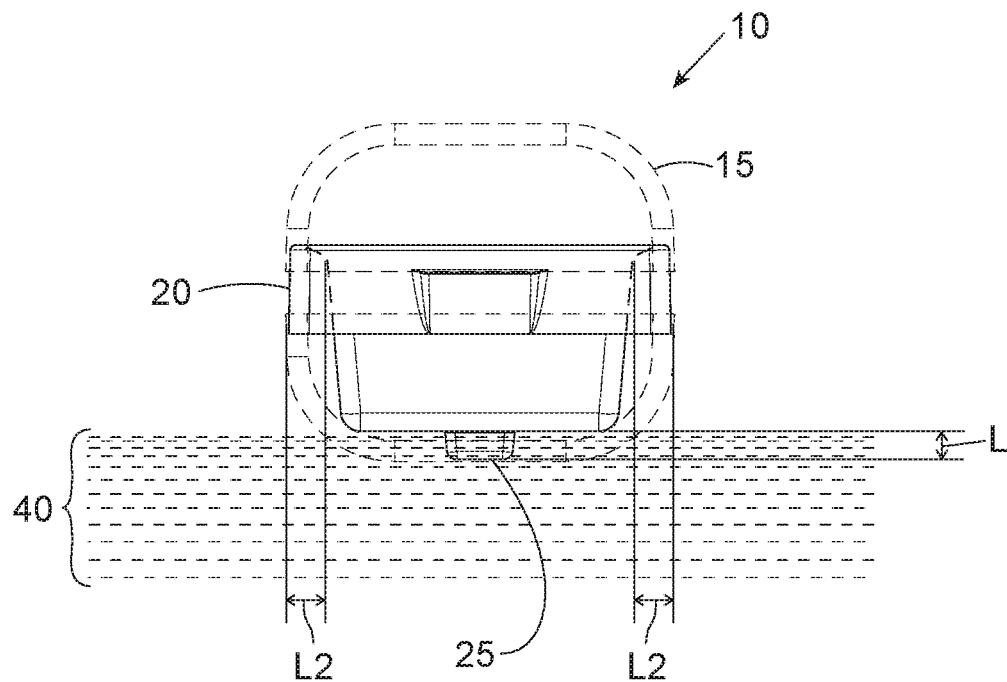
FIG. 8 is a package with the outer shell removed.
Figure 9:
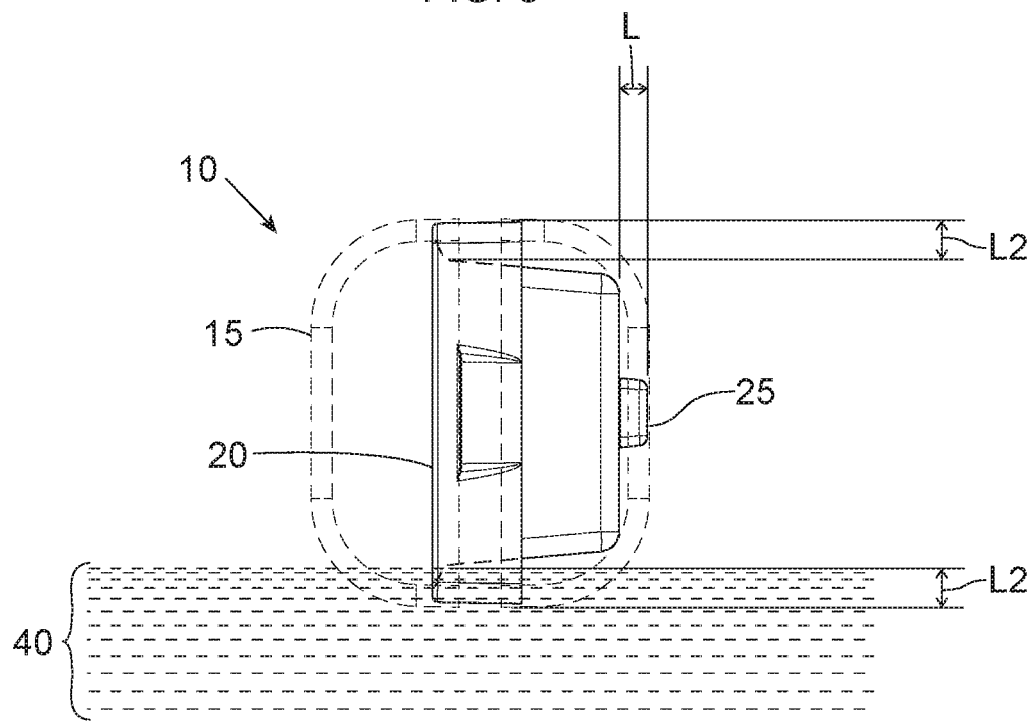
FIG. 9 is a package with the outer shell removed.
Figure 10:
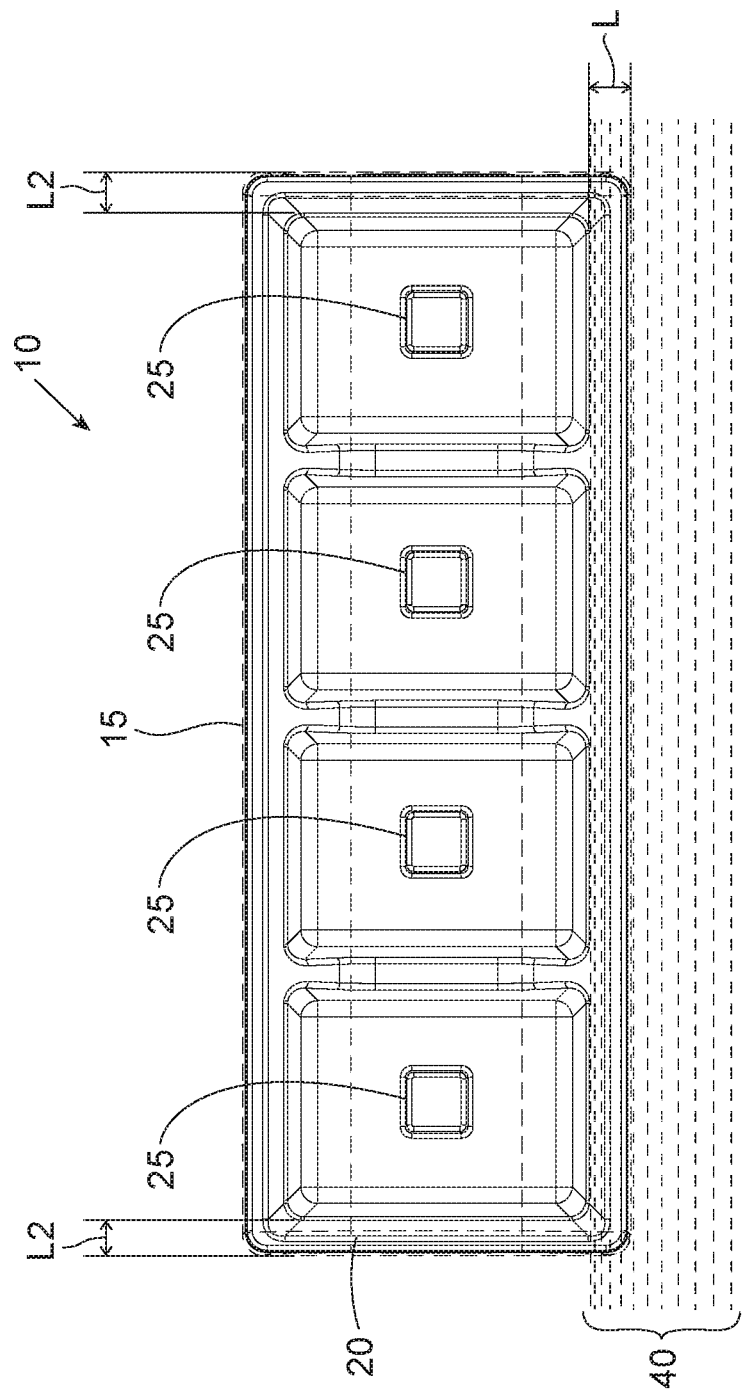
FIG. 10 is a package with the outer shell removed.
Figure 11:
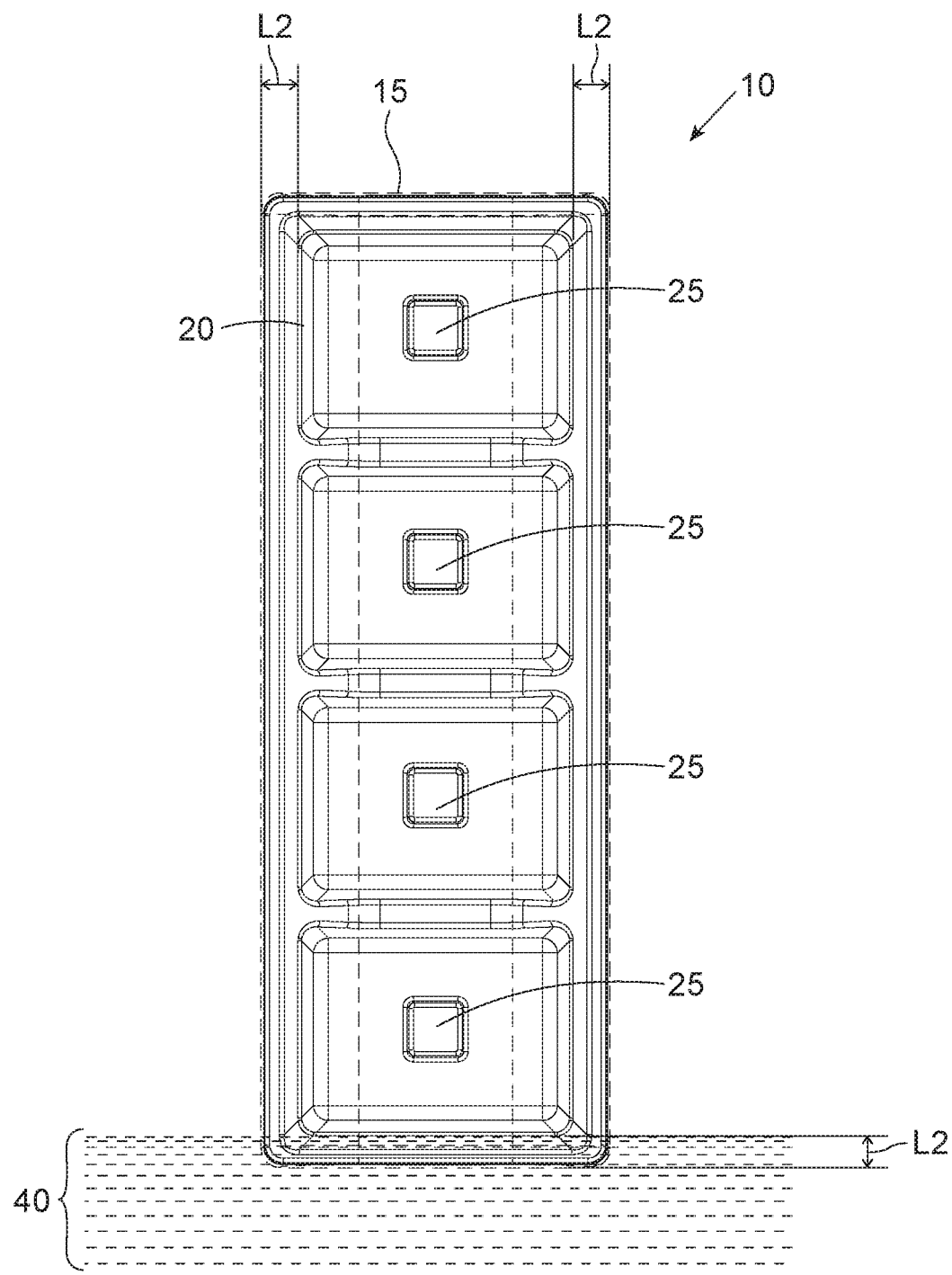
FIG. 11 is a package with the outer shell removed.

FIG. 4 shows a bottom view of the package 10 with the outer shell 15 removed. The inner structure 20 comprises protuberances 25 extending from a surface of the inner structure. FIG. 5 is a cross-section view of FIG. 4 taken along 5-5. FIG. 6 is a cross-section view of FIG. 4 taken along 6-6. As shown in FIG. 5 the outer shell 15 encloses the entire inner structure 20. As shown in FIG. 5, the inner structure sections and the outer surface may have a gap between them (L2). The gap may be the same dimension as the length of a protuberance or it may be smaller than the length of the protuberance. Additionally, as shown in FIG. 5 and FIG. 6 the protuberances may extend from the inner structure 20 surface to the outer shell 15 for a distance equivalent of L1 creating the distance for the gap 30 between the planar surface 32 of the storage section 22 and the outer shell 15.

FIGS. 7-11 show the package 10 of FIGS. 1-6 on a surface 40. FIGS. 7-11 show different potential orientations in which the package 10. As shown in FIGS. 7-11, due to the use of the protuberances 25, the product located in the storage sections 22 is protected from fluids 40 even if the package 10 is placed in fluid 40. Due to the protuberances 25, the package has a protective gap quantified by the length of the protuberances L that protects the storage section 22 or the divided sections 22 that hold product.

Figure 12:
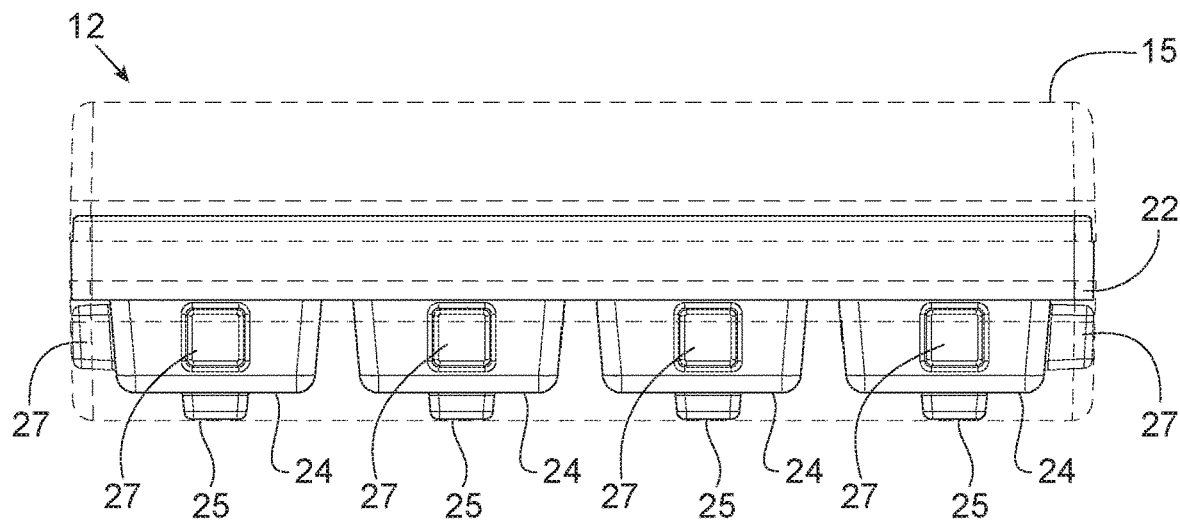
FIG. 12 is an alternative version of a package with the outer shell removed.
Figure 13:
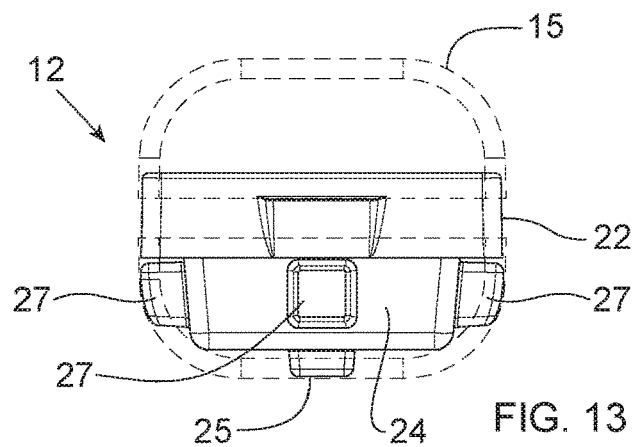
FIG. 13 is an alternative version of a package with the outer shell removed.
Figure 14:
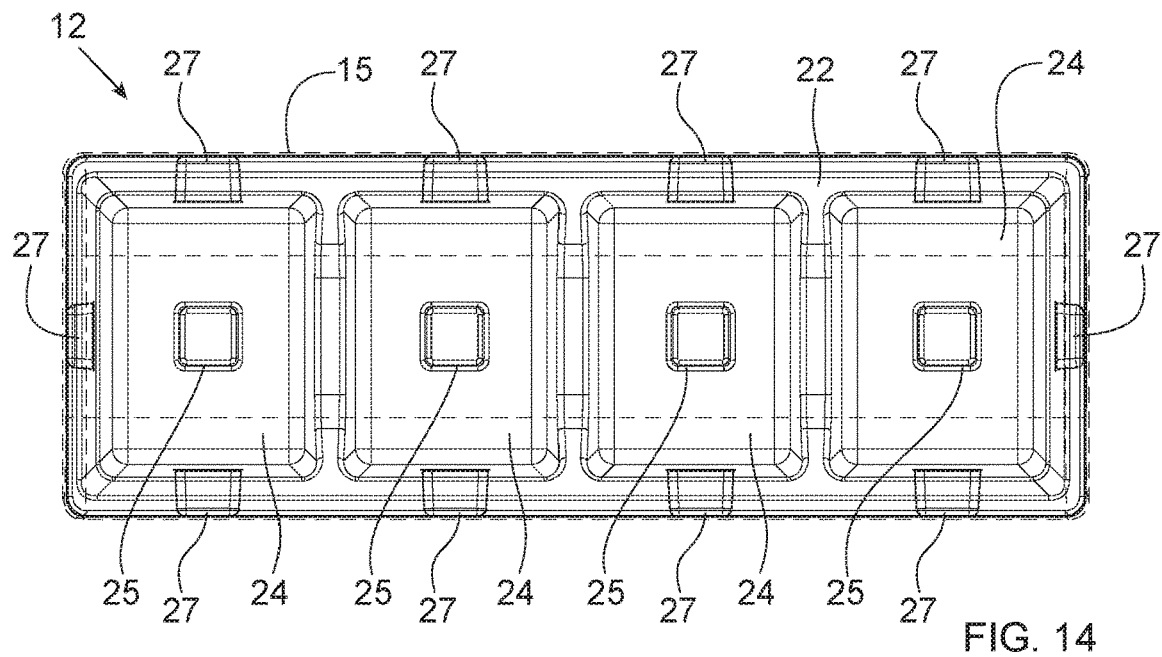
FIG. 14 is an alternative version of a package with the outer shell removed.
Figure 15:
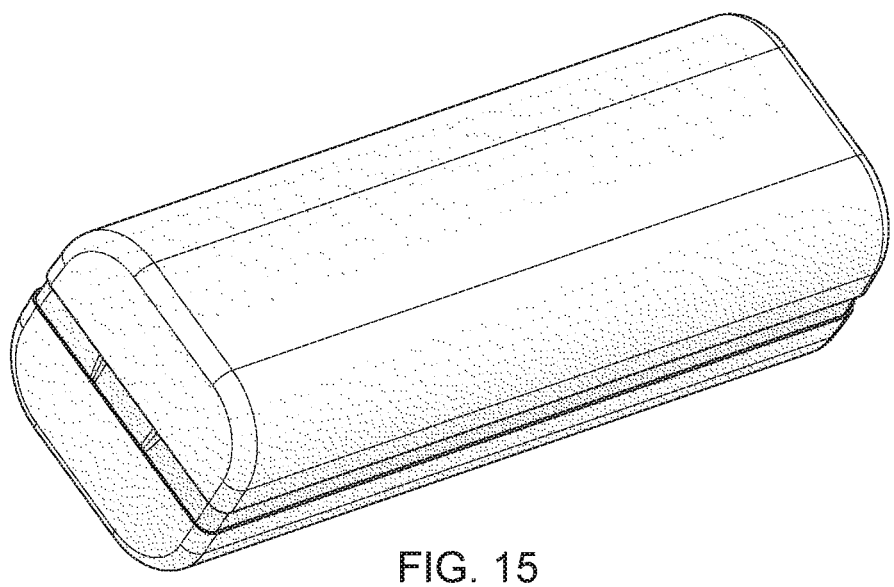
FIG. 15 is a perspective view of an embodiment of a CONTAINER with a lid embodying a new design.
Figure 16:
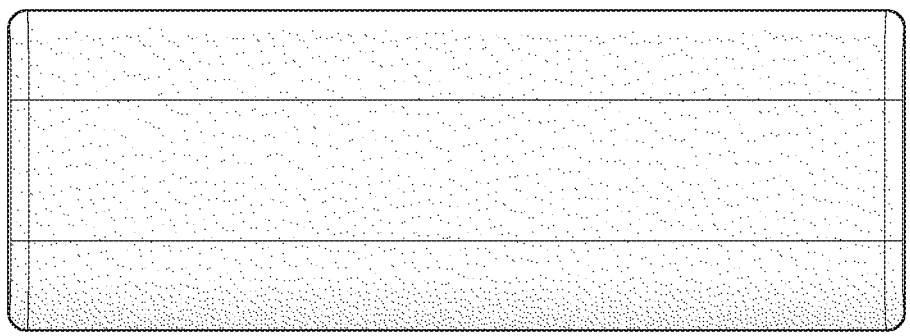
FIG. 16 is a top view of the CONTAINER of FIG. 15.
Figure 17:
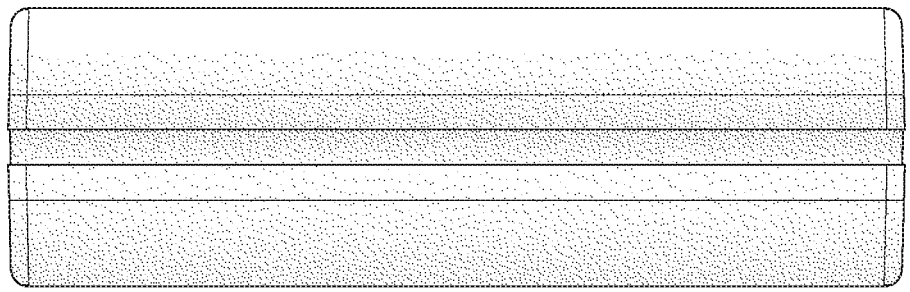
FIG. 17 is a front view of the CONTAINER of FIG. 15.
Figure 22:
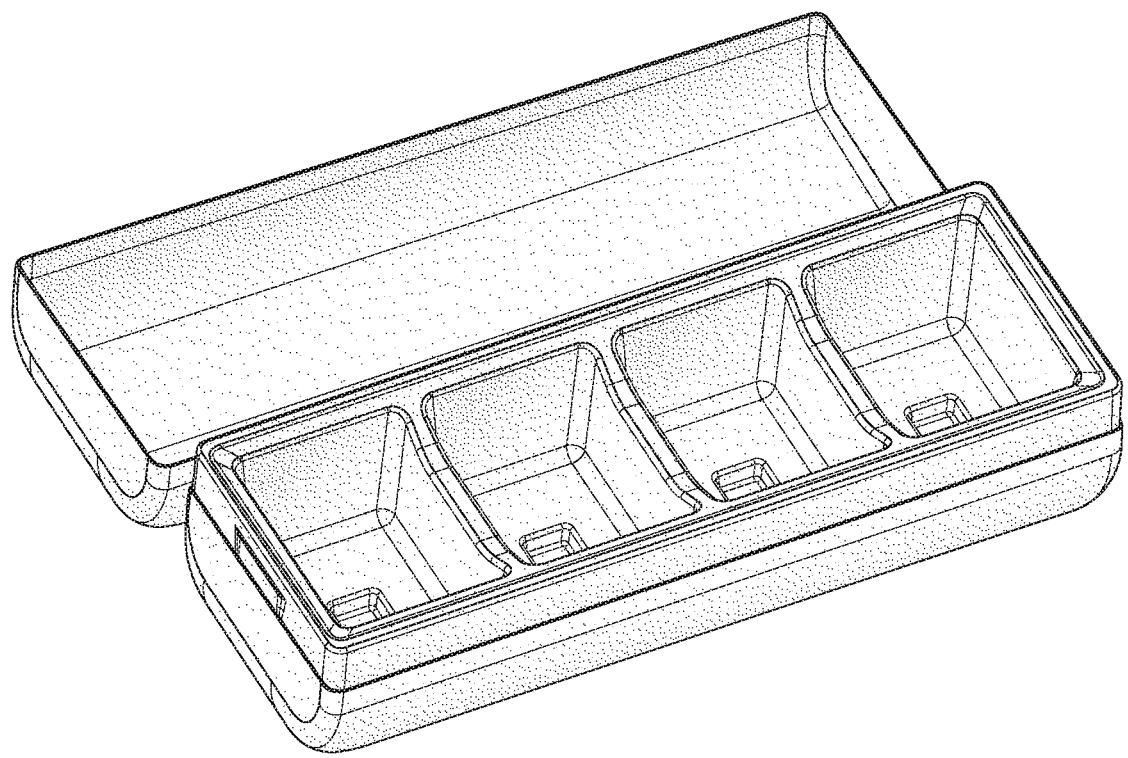
FIG. 22 is a perspective view of an embodiment of a CONTAINER with an open lid embodying a new design.
Figure 23:
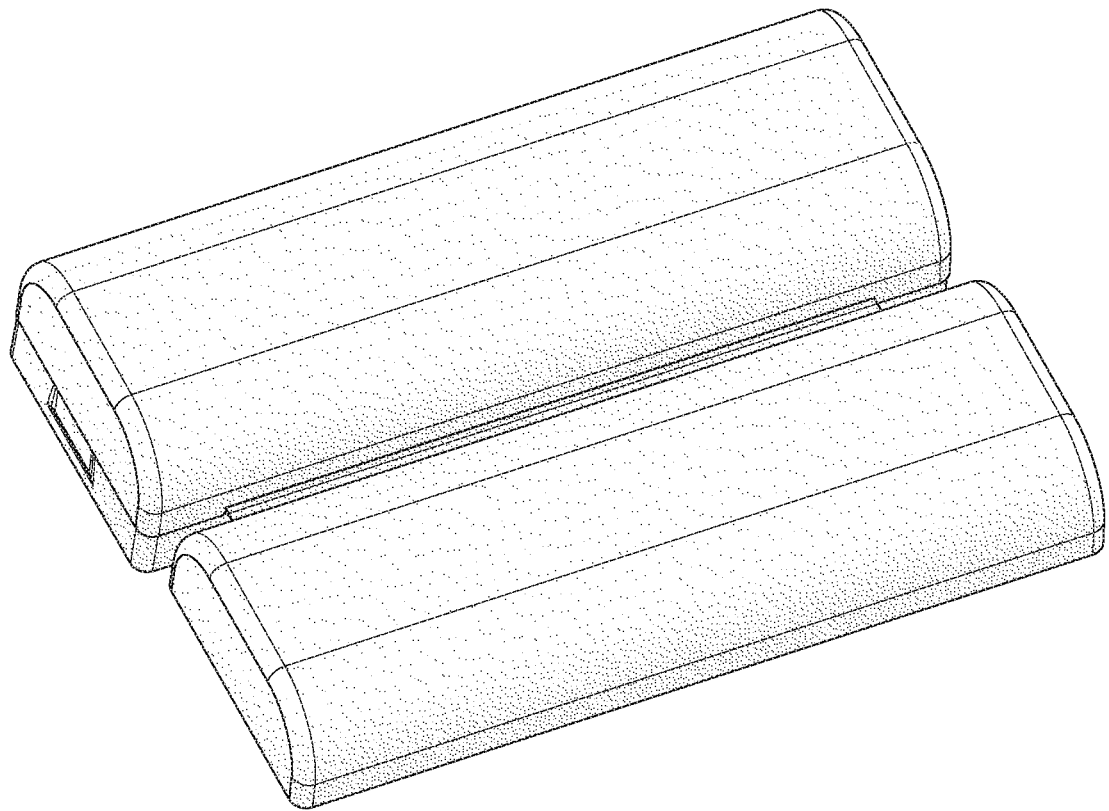
FIG. 23 is a bottom view of the CONTAINER of FIG. 22.
Figure 24:
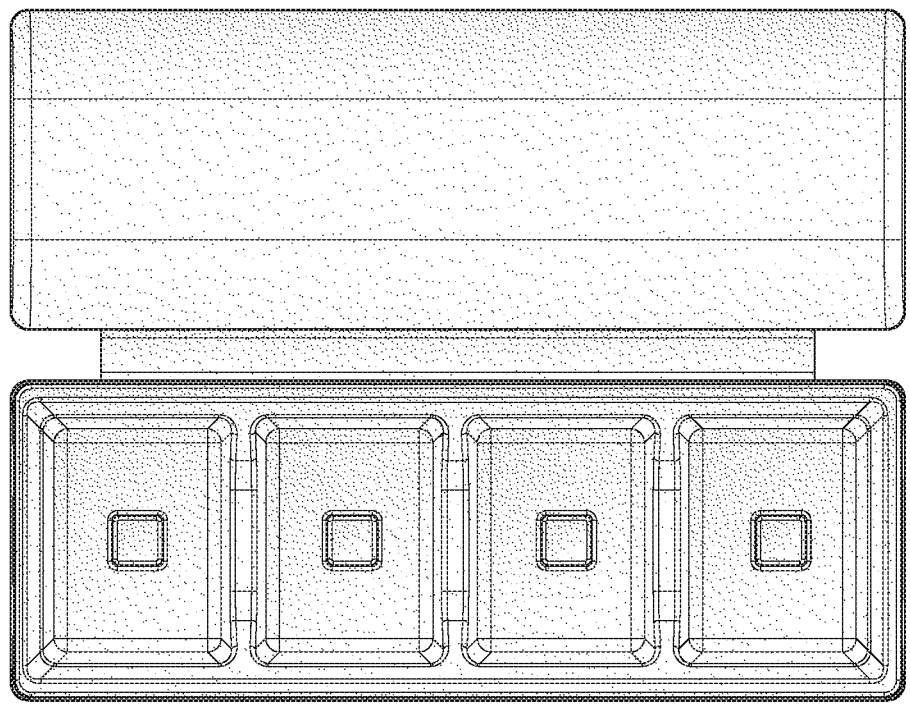
FIG. 24 is a top view of the CONTAINER of FIG. 2.
Figure 25:
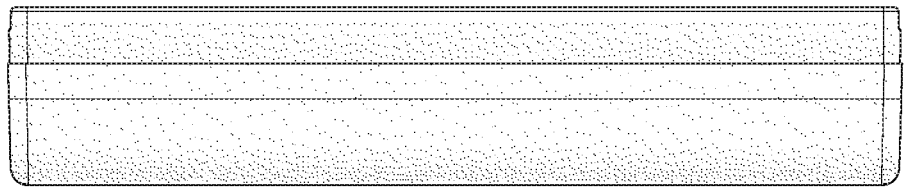
FIG. 25 is a front view of the CONTAINER of FIG. 22.
Figure 26:
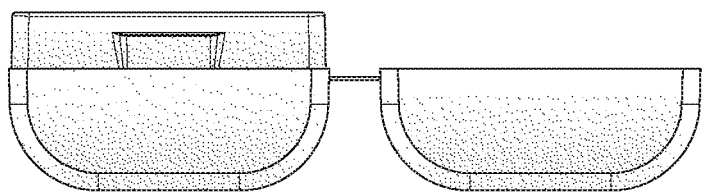
FIG. 26 is a right view of the CONTAINER of FIG. 22.
Figure 27:
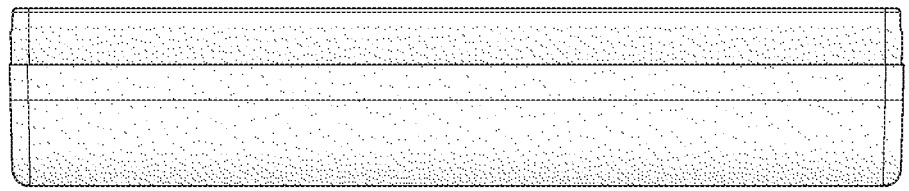
FIG. 27 is a back view of the CONTAINER of FIG. 22.
Figure 28:
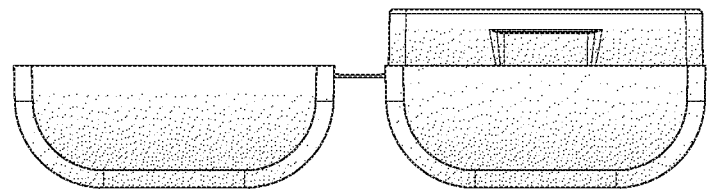
FIG. 28 is a left view of the CONTAINER of FIG. 22.
Figure 29:
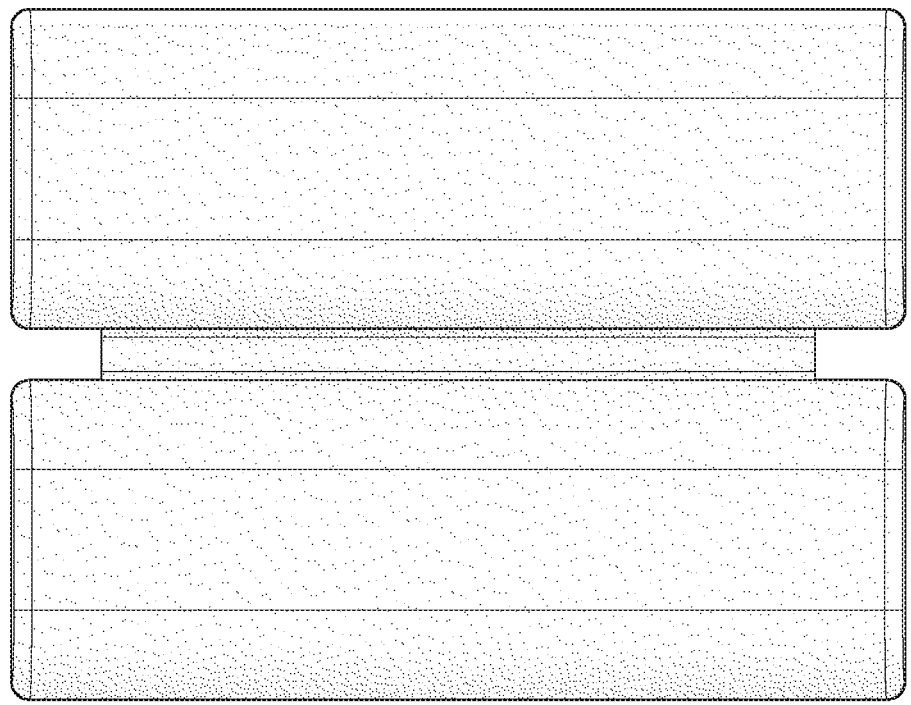
FIG. 29 is a bottom view of the CONTAINER of FIG. 22.

FIGS. 12-14 show different views of a package 10 with the outer shell 15 dotted out. The inner structure 20 has two or more protuberances extending from the surface 24 of the inner structure. As shown in the figures, a protuberance 25 extends from the lower surface of the inner structure 20. Additionally, a protuberance 27 extends from each side wall facing the outer shell 15. The package inner structure 20 may have one or more divided sections 22 enabled to hold one or more single unit dose detergent products.

FIGS. 15-21 show different views of a package design with the lid closed. FIGS. 22-29 show different views of a package design with the lid open.

The inner structure includes a substantially planar top portion and a plurality of divided sections or pans spaced from each other forming cavities or molds depending from the underside of top portion. Each pan includes an inner surface and an outer surface that defines a cavity for receiving the single unit dose products. The sidewalls of each pan may be disposed at an acute angle with respect to top portion, and the bottom wall thereof is substantially parallel to top portion. The sidewalls and bottom wall of each pan may include one or more protuberances extending therefrom. Protuberances may be randomly or uniformly disposed through the sidewalls and bottom wall of each divided section or pan. The protuberances extend from one or more surfaces of the inner structure and may extend to the outer shell of the package or short of contacting the outer shell of the package. The protuberances may be hollow or solid. While not shown, it is contemplated that more than one protuberance may extend from any one surface of the inner structure that faces the outer shell.

As previously discussed, the outer shell and the inner structure are biodegradable. The outer shell and the inner structure may comprise, without limitation, 100% recycled corrugated fiberboard and newspaper, virgin pulp fiber, type-2 molded fiber, type-2A thermoformed fiber, type-3 thermoformed fiber, type-4 thermoformed fiber, molded fiber, X-RAY formed fiber, infrared formed fiber, microwave formed fiber, vacuum formed fiber, structural fiber, sheet stock, recycled plastic or any other structural material that is biodegradable. In an embodiment, the outer shell may be coated with a wax or other coating that does not allow water to permeate provided that the coating is biodegradable. Biodegradable means the outer shell and the inner structure will be able to decompose naturally. In other words, the outer shell and inner structure may be made of substances that will decay relatively quickly as a result of the action of bacteria and break down into elements such as carbon that are recycled naturally. The resulting package may be capable of being broken down and naturally absorbed into the ecosystem. Biodegradable materials may degrade into simple stable compounds that are not harmful to the environment. Unlike traditional packages that may never biodegrade, the resulting package will naturally break down over time. The package including the outer shell and the inner structure may be recyclable, renewable, made of renewable materials, made from renewable materials, or a combination thereof.

The outer shell and/or the inner structure may comprise of plant material, such as, for example, woody material, herbaceous material or product recovery material (fibrous material) and the like. Examples of wood material include and are not limited to, lumber waste, wood processing waste, thinned wood, forest remainder material, include pruned branches (trees, fruit trees), the application site, core, bark, leaves, roots, fruits or there is such a freshman branch of the growth in developing. The herbaceous raw materials include without limitation, for example, bamboo, bagasse, rice hulls, rice straw, wheat straw, grass, bamboo grass, pampas grass, reeds, stems, such as kudzu, leaves, roots, seeds and surrounding tissue, and growth in developing of bamboo shoots. Bamboo and pulp derived from Bamboo is preferred. It is understood that these are examples of plant raw materials and that they are not intended to be limiting. Materials may include any provided that raw materials include plant fibers such as cellulose fibers.

As shown in the figures above, the package described above protects the single unit dose detergent while still being biodegradable. Without being bound by theory, it has been found that the package described above protects the single unit dose products by having one or more protuberances extending from the inner structure. The protuberances create a gap between the outer shell and the storage portion of the inner structure that houses the single unit dose products. The gap may comprise gas or other materials such as, for example, a desiccant. The use of protuberances protects the single unit dose(s) in the storage sections if a package is exposed to fluids by creating a gap between the outer shell and the storage section(s). The protuberances may be formed from between 5% to 70% of a surface portion of the inner structure. The protuberances extend from a planar line of the storage section, the planar line being in contact with the single unit dose housed in the storage section or divided section.

Additionally, by using a biodegradable outer shell and inner structure. The package allows for vapor transmission through the package thereby allowing for breathability in the package.

Single Unit Dose

The single unit dose detergent may be a water-soluble unit dose article comprising a water-soluble fibrous structure and one or more particles. The water-soluble unit dose articles disclosed herein comprise a water-soluble fibrous structure and one or more particles. The water-soluble fibrous structure may comprise a plurality of fibrous elements, for example a plurality of filaments. The one or more particles, for example one or more active agent-containing particles, may be distributed throughout the structure. The water-soluble unit dose article may comprise a plurality of two or more and/or three or more fibrous elements that are inter-entangled or otherwise associated with one another to form a fibrous structure and one or more particles, which may be distributed throughout the fibrous structure.

The fibrous water-soluble unit dose articles may exhibit a thickness of greater than 0.01 mm and/or greater than 0.05 mm and/or greater than 0.1 mm and/or to about 100 mm and/or to about 50 mm and/or to about 20 mm and/or to about 10 mm and/or to about 5 mm and/or to about 2 mm and/or to about 0.5 mm and/or to about 0.3 mm as measured by the Thickness Test Method described herein.

The fibrous water-soluble unit dose articles may have basis weights of from about 500 grams/m$^2$ to about 5,000 grams/m$^2$, or from about 1,000 grams/m$^2$ to about 4,000 grams/m$^2$, or from about 1,500 grams/m$^2$ to about 3,500 grams/m$^2$, or from about 2,000 grams/m$^2$ to about 3,000 grams/m$^2$, as measured according to the Basis Weight Test Method described herein.

The fibrous water-soluble unit dose article may comprise a water-soluble fibrous structure and a plurality of particles distributed throughout the structure, where the water-soluble fibrous structure comprises a plurality of identical or substantially identical, from a compositional perspective, fibrous elements. The water-soluble fibrous structure may comprise two or more different fibrous elements. Non-limiting examples of differences in the fibrous elements may be physical differences, such as differences in diameter, length, texture, shape, rigidity, elasticity, and the like; chemical differences, such as crosslinking level, solubility, melting point, Tg, active agent, filament-forming material, color, level of active agent, basis weight, level of filament-forming material, presence of any coating on fibrous element, biodegradable or not, hydrophobic or not, contact angle, and the like; differences in whether the fibrous element loses its physical structure when the fibrous element is exposed to conditions of intended use; differences in whether the fibrous element's morphology changes when the fibrous element is exposed to conditions of intended use; and differences in rate at which the fibrous element releases one or more of its active agents when the fibrous element is exposed to conditions of intended use. Two or more fibrous elements within the fibrous structure may comprise different active agents. This may be the case where the different active agents may be incompatible with one another, for example an anionic surfactant and a cationic polymer. When using different fibrous elements, the resulting structure may exhibit different wetting, imbibitions, and solubility characteristics.

The fibrous water-soluble unit dose article may exhibit different regions, such as different regions of basis weight, density, caliper, and/or wetting characteristics. The fibrous water-soluble unit dose article may be compressed at the point of edge sealing. The fibrous water-soluble unit dose article may comprise texture on one or more of its surfaces. A surface of the fibrous water-soluble unit dose article may comprise a pattern, such as a non-random, repeating pattern.

The fibrous water-soluble unit dose article may comprise apertures. The fibrous water-soluble unit dose article may comprise a fibrous structure having discrete regions of fibrous elements that differ from other regions of fibrous elements in the structure. The fibrous water-soluble unit dose article may be used as is or it may be coated with one or more active agents.

The fibrous water-soluble unit dose article may comprise one or more plies. The fibrous water-soluble unit dose article may comprise at least two and/or at least three and/or at least four and/or at least five plies. The fibrous plies can be fibrous structures made from a "Filament-forming composition" and/or a "fibrous element-forming composition". Each ply may comprise one or more layers, for example one or more fibrous element layers, one or more particle layers, and/or one or more fibrous element/particle mixture layers. The layer(s) may be sealed. In particular, particle layers and fibrous element/particle mixture layers may be sealed, such that the particles do not leak out. The water-soluble unit dose articles may comprise multiple plies, where each ply comprises two layers, where one layer is a fibrous element layer and one layer is a fibrous element/particle mixture layer, and where the multiple plies are sealed (e.g., at the edges) together. Sealing may inhibit the leakage of particles as well as help the unit dose article maintain its original structure. However, upon addition of the water-soluble unit dose article to water, the unit dose article dissolves and releases the particles into the wash liquor.

The fibrous elements and/or particles may be arranged within the water-soluble unit dose article, in a single ply or in multiple plies, to provide the article with two or more regions that comprise different active agents. For example, one region of the article may comprise bleaching agents and/or surfactants and another region of the article may comprise softening agents.

The fibrous water-soluble unit dose article can be viewed hierarchically starting from the form in which the consumer interacts with the water-soluble article and working backward to the raw materials from which the water-soluble article is made, e.g., plies, fibrous structures, and particles. The fibrous plies can be fibrous structures.

The water-soluble unit dose article described herein may comprise a water-soluble fibrous structure and one or more rheology-modified particles comprising: (a) from about 10 wt % to about 80 wt % of an alkylalkoxylated sulfate; and (b) from about 0.5 wt % to about 20 wt % of a rheology modifier. The particles described herein may comprise one or more additional active agents (in addition to surfactant as described hereinabove).

"Filament-forming composition" and/or "fibrous element-forming composition" as used herein means a composition that is suitable for making a fibrous element of the present invention such as by meltblowing and/or spunbonding. The filament-forming composition comprises one or more filament-forming materials that exhibit properties that make them suitable for spinning into a fibrous element. The filament-forming material may comprise a polymer. In addition to one or more filament-forming materials, the filament-forming composition may comprise one or more active agents, for example, a surfactant. In addition, the filament-forming composition may comprise one or more polar solvents, such as water, into which one or more, for example all, of the filament-forming materials and/or one or more, for example all, of the active agents are dissolved and/or dispersed prior to spinning a fibrous element, such as a filament from the filament-forming composition.

The filament-forming composition may comprise two or more different filament-forming materials. Thus, the fibrous elements may be monocomponent (one type of filament-forming material) and/or multicomponent, such as bicomponent. The two or more different filament-forming materials may be randomly combined to form a fibrous element. The two or more different filament-forming materials may be orderly combined to form a fibrous element, such as a core and sheath bicomponent fibrous element, which is not considered a random mixture of different filament-forming materials for purposes of the present disclosure. Bicomponent fibrous elements may be in any form, such as side-by-side, core and sheath, islands-in-the-sea and the like.

The fibrous elements may be substantially free of alkylalkoxylated sulfate. Each fibrous element may comprise from about 0%, or from about 0.1%, or from about 5%, or from about 10%, or from about 15%, or from about 20%, or from about 25%, or from about 30%, or from about 35%, or from about 40% to about 0.2%, or to about 1%, or to about 5%, or to about 10%, or to about 15%, or to about 20%, or to about 25%, or to about 30%, or to about 35% or to about 40%, or to about 50% by weight on a dry fibrous element basis of an alkylalkoxylated sulfate. The amount of alkylalkoxylated sulfate in each of the fibrous elements is sufficiently small so as not to affect the processing stability and film dissolution thereof. Alkylalkoxylated sulfates, when dissolved in water, may undergo a highly viscous hexagonal phase at certain concentration ranges, e.g., 30-60% by weight, resulting in a gel-like substance. Therefore, if incorporated into the fibrous elements in a significant amount, alkylalkoxylated sulfates may significantly slow down the dissolution of the water-soluble unit dose articles in water, and worse yet, result in undissolved solids afterwards. Correspondingly, most of such surfactants are formulated into the particles.

The fibrous elements may each contain at least one filament-forming material and an active agent, preferably a surfactant. The surfactant may have a relatively low hydrophilicity, as such a surfactant is less likely to form a viscous, gel-like hexagonal phase when being diluted. By using such a surfactant in forming the filaments, gel-formation during wash may be effectively reduced, which in turn may result in faster dissolution and low or no residues in the wash. The surfactant can be selected, for example, from the group consisting of unalkoxylated C6-C20 linear or branched alkyl sulfates (AS), C6-C20 linear alkylbenzene sulfonates (LAS), and combinations thereof. The surfactant may be a C6-C20 linear alkylbenzene sulfonates (LAS). LAS surfactants are well known in the art and can be readily obtained by sulfonating commercially available linear alkylbenzenes. Exemplary $C_6$-$C_{20}$ linear alkylbenzene sulfonates that can be used include alkali metal, alkaline earth metal or ammonium salts of $C_6$-$C_{20}$ linear alkylbenzene sulfonic acids, such as the sodium, potassium, magnesium and/or ammonium salts of $C_{11}$-$C_{18}$ or $C_{11}$-$C_{14}$ linear alkylbenzene sulfonic acids. The sodium or potassium salts of $C_{12}$ linear alkylbenzene sulfonic acids, for example, the sodium salt of $C_{12}$ linear alkylbenzene sulfonic acid, i.e., sodium dodecylbenzene sulfonate, may be used as the first surfactant.

The fibrous element may comprise at least about 5%, and/or at least about 10%, and/or at least about 15%, and/or at least about 20%, and/or less than about 80%, and/or less than about 75%, and/or less than about 65%, and/or less than about 60%, and/or less than about 55%, and/or less than about 50%, and/or less than about 45%, and/or less than about 40%, and/or less than about 35%, and/or less than about 30%, and/or less than about 25% by weight on a dry fibrous element basis and/or dry fibrous structure basis of the filament-forming material and greater than about 20%, and/or at least about 35%, and/or at least about 40%, and/or at least about 45%, and/or at least about 50%, and/or at least about 55%, and/or at least about 60%, and/or at least about 65%, and/or at least about 70%, and/or less than about 95%, and/or less than about 90%, and/or less than about 85%, and/or less than about 80%, and/or less than about 75% by weight on a dry fibrous element basis and/or dry fibrous structure basis of an active agent, preferably surfactant. The fibrous element may comprise greater than about 80% by weight on a dry fibrous element basis and/or dry fibrous structure basis of surfactant.

Preferably, each fibrous element may be characterized by a sufficiently high total surfactant content, e.g., at least about 30%, or at least about 40%, or at least about 50%, or at least about 60%, or at least about 70%, by weight on a dry fibrous element basis and/or dry fibrous structure basis of the first surfactant.

The total level of filament-forming materials present in the fibrous element may be from about 5% to less than about 80% by weight on a dry fibrous element basis and/or dry fibrous structure basis and the total level of surfactant present in the fibrous element may be greater than about 20% to about 95% by weight on a dry fibrous element basis and/or dry fibrous structure basis.

One or more of the fibrous elements may comprise at least one additional surfactant selected from the group consisting of other anionic surfactants (i.e., other than AS and LAS), nonionic surfactants, zwitterionic surfactants, amphoteric surfactants, cationic surfactants, and combinations thereof.

Figure 30:
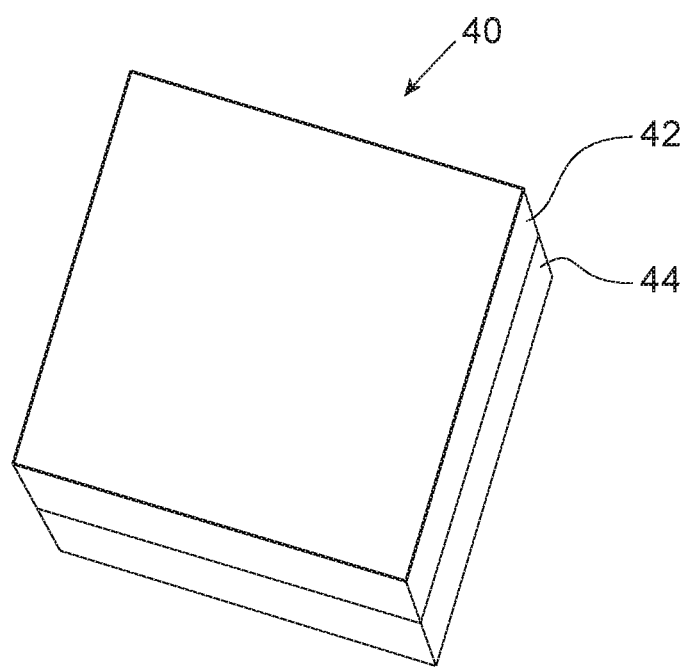
FIG. 30 is a water-soluble unit dose article.

A water-soluble unit dose article 40 is shown in FIG. 30. The water-soluble unit dose article 40 can comprise a water soluble fibrous first ply 42 and water soluble fibrous second ply 44 that are superposed relative to one another. The first ply 42 and second ply 44 are joined to one another to form a unitary water-soluble unit dose article 40. The water-soluble unit dose article 40 can have a mass from about 50 mg to about 30 g, optionally about 100 mg to about 20 g, optionally about 1 g to about 20 g. The water-soluble unit dose article 40 can have a length and width from about 5 mm to about 20 cm, optionally from about 1 cm to about 10 cm, and a thickness from about 1 mm to about 2 cm, optionally about 2 mm to about 10 mm.

The single unit dose may be a water-soluble unit dose article comprising a water-soluble film and a laundry detergent composition. The laundry detergent composition is described in more detail below. The water-soluble film is described in more detail below.

The water-soluble unit dose article comprises the water-soluble film shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the detergent composition does not leak out of the compartment during storage. However, upon addition of the water-soluble unit dose article to water, the water-soluble film dissolves and releases the contents of the internal compartment into the wash liquor.

The compartment should be understood as meaning a closed internal space within the unit dose article, which holds the detergent composition. During manufacture, a first water-soluble film may be shaped to comprise an open compartment into which the detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments. The compartments may be arranged in superposed orientation, i.e. one positioned on top of the other. In such an orientation the unit dose article will comprise three films, top, middle and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment, but does not completely enclose the second compartment. Alternatively one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments.

Each compartment may comprise the same or different compositions. The different compositions could all be in the same form, or they may be in different forms.

The water-soluble unit dose article may comprise at least two internal compartments, wherein the laundry detergent composition is comprised in at least one of the compartments, preferably wherein the unit dose article comprises at least three compartments, wherein the detergent composition is comprised in at least one of the compartments.

The water-soluble unit dose article may comprise at least two compartments, preferably at least three compartments, wherein the laundry detergent composition is comprised within at least one compartment. The laundry detergent composition may represent a culmination of ingredients located within all the compartments of the unit dose article. The water-soluble unit dose article comprises a first water-soluble film and a second water-soluble film which are sealed together at a seal region. The laundry detergent composition is comprised within the water-soluble soluble unit dose article.

Laundry Detergent Composition

The water-soluble unit dose article comprises a laundry detergent composition. The laundry detergent composition, may be a liquid, a solid or a mixture thereof.

The term 'solid laundry detergent composition' refers to any laundry detergent composition that is solid. Solid can include, particles, compressed solids or a mixture thereof.

The term 'liquid laundry detergent composition' refers to any laundry detergent composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules.

The detergent composition can be used in a fabric hand wash operation or may be used in an automatic machine fabric wash operation.

The laundry detergent composition comprises a zwitterionic polyamine. The zwitterionic polyamine is described in more detail below.

The water-soluble unit dose article may comprise between 0.01% to about 20%, preferably from 0.1% to 10%, more preferably from 0.5% to 7%, even more preferably from 1% to 5%, most preferably from 2% to 4% by weight of the laundry detergent composition of the zwitterionic polyamine.

The laundry detergent composition comprises between 10% and 40%, preferably between 12% and 37%, more preferably between 15% and 35% by weight of the laundry detergent composition of a non-soap surfactant.

The non-soap surfactant optionally comprises a non-ionic surfactant and wherein the laundry detergent composition preferably comprises between 0% and 10%, preferably between 0.01% and 8%, more preferably between 0.1% and 6%, most preferably between 0.15% and 4% by weight of the laundry detergent composition of a non-ionic surfactant. Preferably, the non-ionic surfactant is selected from alcohol alkoxylate, an oxo-synthesised alcohol alkoxylate, Guerbet alcohol alkoxylates, alkyl phenol alcohol alkoxylates or a mixture thereof.

Suitable alcohol ethoxylate nonionic surfactants include the condensation products of aliphatic alcohols with from 1 to 25 moles of ethylene oxide. The alkyl chain of the aliphatic alcohol can either be straight or branched, guerbet, primary or secondary, and generally contains from 8 to 22 carbon atoms. The starting alcohol can be naturally derived, e.g. starting from natural oils, or synthetically derived, e.g. alcohols obtained from for example oxo-, modified oxo- or Fischer-Tropsch processes. Examples of oxo-process derived alcohols include the Lial and Isalchem alcohols ex Sasol company and Lutensol alcohols ex BASF company. Examples of modified-oxo process derived alcohols include the Neodol alcohols ex Shell company. Fischer-Tropsch derived alcohols include Safol alcohols ex Sasol company. The alkoxylate chain of alcohol ethoxylates is made up solely of ethoxylate groups.

Preferably, the alcohol ethoxylate non-ionic surfactant comprises on average between 8 and 18, more preferably between 10 and 16 even more preferably between 12 and 15 carbon atoms in the alcohol carbon chain, and on average between 5 and 12, preferably between 6 and 10, more preferably between 7 and 8 ethoxy units in the ethoxylation chain.

Preferably, the non-soap surfactant comprises linear alkylbenzene sulphonate and wherein the laundry detergent composition comprises between 5% and 20%, preferably between 10% and 17% by weight of the laundry detergent composition of the linear alkylbenzene sulphonate.

Preferably, the non-soap surfactant comprises an alkyl sulphate, alkoxylated alkyl sulphate or a mixture thereof and wherein the laundry detergent composition comprises between 5% and 20%, preferably between 7% and 18%, more preferably between 10% and 17% by weight of the alkyl sulphate, alkoxylated alkyl sulphate or a mixture thereof. Preferably, the alkoxylated alkyl sulphate is an ethoxylated alkyl sulphate with an average degree of ethoxylation of between 0.5 and 7, preferably between 1 and 5, more preferably between 2 and 4, most preferably about 3. Alternatively, the non-soap surfactant comprises a mixture of one or more alkoxylated alkyl sulphates, preferably ethoxylated alkyl sulphates, and optionally an alkyl sulphate, the mixture having an average degree of ethoxylation of between 0.5 and 7, preferably between 1 and 5, more preferably between 2 and 4, most preferably about 3.

Preferably, the weight ratio of alkoxylated alkyl sulphate to linear alkylbenzene sulphonate is from 2:1 to 1:8 preferably from 1:1 to 1:5 most preferably from 1:1.25 to 1:4.

Preferably, the weight ratio of non-soap anionic surfactant to non-ionic surfactant is from 1:1 to 40:1, preferably from 1:1 to 20:1, more preferably from 1.3:1 to 15:1, even more preferably from 1.5:1 to 10:1.

Preferably, the laundry detergent composition comprises between 10% and 60%, preferably between 12% and 50%, most preferably between 15% and 40% by weight of the laundry detergent composition of a non-aqueous solvent. Preferably, the non-aqueous solvent is selected from 1,2-Propanediol, glycerol, sorbitol, dipropylene glycol, tripropyleneglycol, polypropylene glycol or a mixture thereof.

Preferably, the water-soluble unit dose article comprises 15% or less by weight of the unit dose article of water, preferably the unit dose article comprises between 0.1% and 15%, more preferably between 1% and 12.5% by weight of the unit dose article of water.

The laundry detergent composition may comprise a polymer selected from amphiphilic graft copolymers, carboxymethyl cellulose, modified carboxymethylcellulose, polyester terephthalate polymers, hydroxyethylcellulose, modified hydroxyethylcellulose or a mixture thereof. Especially preferred are cationic modified hydroxyethylcellulose. Preferably, the laundry detergent composition comprises between 0.5% and 10%, preferably between 0.75% and 7%, more preferably between 1.5% and 5% by weight of the laundry detergent composition of the polymer.

The laundry detergent composition may comprise between 0% and 10%, preferably between 0.1% and 7%, more preferably between 0.2% and 5% by weight of the laundry detergent composition of a fatty acid, a neutralised fatty acid soap or a mixture thereof.

Preferably, the water-soluble unit dose article comprises less than 3%, preferably less than 2% by weight of the laundry detergent composition of ethoxylated polyethyleneimine or Zwitterionic polyamine. The laundry detergent composition may comprise essentially no ethoxylated polyethyleneimine or Zwitterionic polyamine. Alternatively, the laundry detergent composition may comprise low levels of an ethoxylated polyethyleneimine. The laundry detergent composition may comprise between 0.01% and 3%, preferably between 0.01% and 2% by weight of the laundry detergent composition of an ethoxylated polyethyleneimine.

Water-Soluble Film

The film of the present invention is soluble or dispersible in water. The water-soluble film preferably has a thickness of from 20 to 150 micron, preferably 35 to 125 micron, even more preferably 50 to 110 micron, most preferably about 76 micron.

Preferably, the film has a water-solubility of at least 50%, preferably at least 75% or even at least 95%, as measured by the method set out here after using a glass-filter with a maximum pore size of 20 microns:

5 grams [Symbol] 0.1 gram of film material is added in a pre-weighed 3 L beaker and 2 L±5 ml of distilled water is added. This is stirred vigorously on a magnetic stirrer, Labline model No. 1250 or equivalent and 5 cm magnetic stirrer, set at 600 rpm, for 30 minutes at 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethyl cellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Mixtures of polymers and/or copolymers can also be used as the pouch material, especially mixtures of polyvinylalcohol polymers and/or copolymers, especially mixtures of polyvinylalcohol homopolymers and/or anionic polyvinylalcohol copolymers preferably selected from sulphonated and carboxylated anionic polyvinylalcohol copolymers especially carboxylated anionic polyvinylalcohol copolymers. Most preferably the water soluble film comprises a blend of a polyvinylalcohol homopolymer and a carboxylated anionic polyvinylalcohol copolymer.

Preferred films exhibit good dissolution in cold water, meaning unheated distilled water. Preferably such films exhibit good dissolution at temperatures of 24° C., even more preferably at 10° C. By good dissolution it is meant that the film exhibits water-solubility of at least 50%, preferably at least 75% or even at least 95%, as measured by the method set out here after using a glass-filter with a maximum pore size of 20 microns, described above.

Preferred films are those supplied by Monosol under the trade references M8630, M8900, M8779, M8310.

The film may be opaque, transparent or translucent. The film may comprise a printed area.

The area of print may be achieved using standard techniques, such as flexographic printing or inkjet printing.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, 1 to 5000 ppm, or even 100 to 2500 ppm, or even 250 to 2000 rpm.

Package Examples

A. A package for a single unit dose detergent, the package comprising a biodegradable outer shell and an inner structure, wherein the inner tray comprises of one or more protuberances, wherein the package further comprises a gap between the inner tray and the outer shell adjacent to the one or more protuberances.
B. The package for a single unit dose detergent of paragraph A, wherein the outer shell is biodegradable.
C. The package for a single unit dose detergent of any of the preceding paragraphs, wherein the package inner tray is biodegradable.
D. The package for a single unit dose detergent of any of the preceding paragraphs, wherein the package inner tray protuberances are located on the lower surface of the tray.
E. The package for a single unit dose detergent of any of the preceding paragraphs, wherein the protuberances are hollow.
F. The package for a single unit dose detergent of any of the preceding paragraphs, wherein the protuberances are located one two or more surfaces of the inner structure.
G. The package for a single unit dose detergent of any of the preceding paragraphs, wherein the inner structure comprises of two or more storage sections.
H. The package for a single unit dose detergent of paragraph G, wherein each of the two or more storage sections comprise a protuberance.
I. The package for a single unit dose detergent of any of the preceding paragraphs, wherein a protuberance extending form the inner structure contacts the outer shell.
J. The package for a single unit dose detergent of any of the preceding paragraphs, wherein the outer shell comprises a lid and a bottom, wherein the lid is removable.
K. The package for a single unit dose detergent of any of the preceding paragraphs, wherein the package inner tray is integral to the package outer shell.

It should be understood from the foregoing that, while particular implementations have been illustrated and described, various modifications can be made thereto and are contemplated herein. It is also not intended that the claims be limited by the specific examples provided within the specification. Parts of one embodiment may be easily removed and added to another embodiment. While the claims have been described with reference to the aforementioned specification, the descriptions and illustrations of the preferable embodiments herein are not meant to be construed in a limiting sense. Furthermore, it shall be understood that all aspects of the claims are not limited to the specific depictions, configurations or relative proportions set forth herein which depend upon a variety of conditions and variables.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A package for a single unit dose detergent, the package comprising a biodegradable outer shell and an inner structure, wherein the inner structure comprises divided sections which comprise a bottom; extending downward from the bottom of the divided sections is one or more protuberances with a bottom, wherein the package further comprises a gap between the inner structure and the outer shell adjacent to the bottom of the one or more protuberances, wherein the protuberances are hollow.

2. The package for a single unit dose detergent of claim 1, wherein the inner structure is biodegradable.

3. The package for a single unit dose detergent of claim 1, wherein the protuberances are located on two or more surfaces of the inner structure.

4. The package for a single unit dose detergent of claim 1, wherein at least one of the one or more protuberances extend from the inner structure contacting the outer shell.

5. A package for a single unit dose detergent, the package comprising a biodegradable outer shell and a biodegradable inner tray, wherein the inner tray comprises divided sections which comprise a bottom; extending downward from the bottom of the divided sections is one or more protuberances with a bottom, wherein the package further comprises a gap between the inner tray and the outer shell adjacent to the bottom of the one or more protuberances, wherein the protuberances are hollow.

6. The package for a single unit dose detergent of claim 5, wherein the outer shell comprises a lid and a bottom, wherein the lid is removable.

7. The package for a single unit dose detergent of claim 5, wherein the package inner tray is integral to the package outer shell.

8. The package for a single unit dose detergent of claim 5, wherein the one or more protuberances extending from the inner tray contacts the outer shell.

* * * * *